United States Patent
Zhang et al.

(10) Patent No.: US 12,335,314 B2
(45) Date of Patent: Jun. 17, 2025

(54) MICROSERVICE-BASED SERVICE MESH SYSTEM AND SERVICE ORIENTED ARCHITECTURE GOVERNANCE METHOD

(71) Applicant: Huawei Cloud Computing Technologies Co., Ltd., Guizhou (CN)

(72) Inventors: Wei Zhang, Beijing (CN); Yongming Zhang, Beijing (CN); Chaomeng Zhang, Hangzhou (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 275 days.

(21) Appl. No.: 18/192,082

(22) Filed: Mar. 29, 2023

(65) Prior Publication Data

US 2023/0239326 A1 Jul. 27, 2023

Related U.S. Application Data

(63) Continuation of application No. PCT/CN2021/120838, filed on Sep. 27, 2021.

(30) Foreign Application Priority Data

Sep. 29, 2020 (CN) .......................... 202011050249.5
Dec. 31, 2020 (CN) .......................... 202011641555.6

(51) Int. Cl.
*H04L 29/06* (2006.01)
*H04L 9/40* (2022.01)

(52) U.S. Cl.
CPC .............. *H04L 63/20* (2013.01); *H04L 63/10* (2013.01)

(58) Field of Classification Search
CPC ..... H04L 63/10; H04L 63/20; H04L 63/1408; H04L 63/126; H04L 63/0263; H04L 63/18
See application file for complete search history.

(56) References Cited

U.S. PATENT DOCUMENTS 10,762,193 B2 * 9/2020 Lev-Ran ................ H04L 9/3263
11,516,254 B2 * 11/2022 Singh ..................... H04L 63/10
(Continued)

FOREIGN PATENT DOCUMENTS

| CN | 110401696 A | 11/2019 |
|---|---|---|
| CN | 110554856 A | 12/2019 |

(Continued)

OTHER PUBLICATIONS

Anonymous: "Wikipedia—Expansion card", Sep. 28, 2020 (Sep. 28, 2020), XP093193582, total 9 pages.
(Continued)

*Primary Examiner* — Longbit Chai
(74) *Attorney, Agent, or Firm* — Conley Rose, P.C.

(57) ABSTRACT

A microservice-based service mesh system includes a first node. The first node includes a first host and a first data card. A first pod runs on the first host. The first pod is provided with a first microservice. The first data card receives a service-oriented architecture (SOA) governance policy and performs SOA governance on a first access request sent by the first host to the first data card through the first data channel. The first access request is an access request that is of the first microservice for a second microservice and that is obtained by the first host from the first pod. The system performs SOA governance on an access request from a host using a data card inserted into the host.

20 Claims, 19 Drawing Sheets

(56) References Cited

U.S. PATENT DOCUMENTS

2019/0273746 A1    9/2019  Coffing
2023/0239326 A1*   7/2023  Zhang .................... H04L 63/20
                                                         726/1

FOREIGN PATENT DOCUMENTS

CN      111478771 A    7/2020
EP        3979592 A1   4/2022
JP      2005318367 A   11/2005

OTHER PUBLICATIONS

Casey Jerome: "Computer Hardware: Hardware Components and Internal PC Connections," 2015, XP093193579, total 25 pages.
Chen Caiyi: "PCI Express-based Ethernet Switch," May 2012 (May 1, 2012), XP093193581, total 109 pages.
Posta Christian et al: "Introducing Istio Service Mesh for Microservices," Apr. 1, 2018, XP093101054, 7 pages.

* cited by examiner

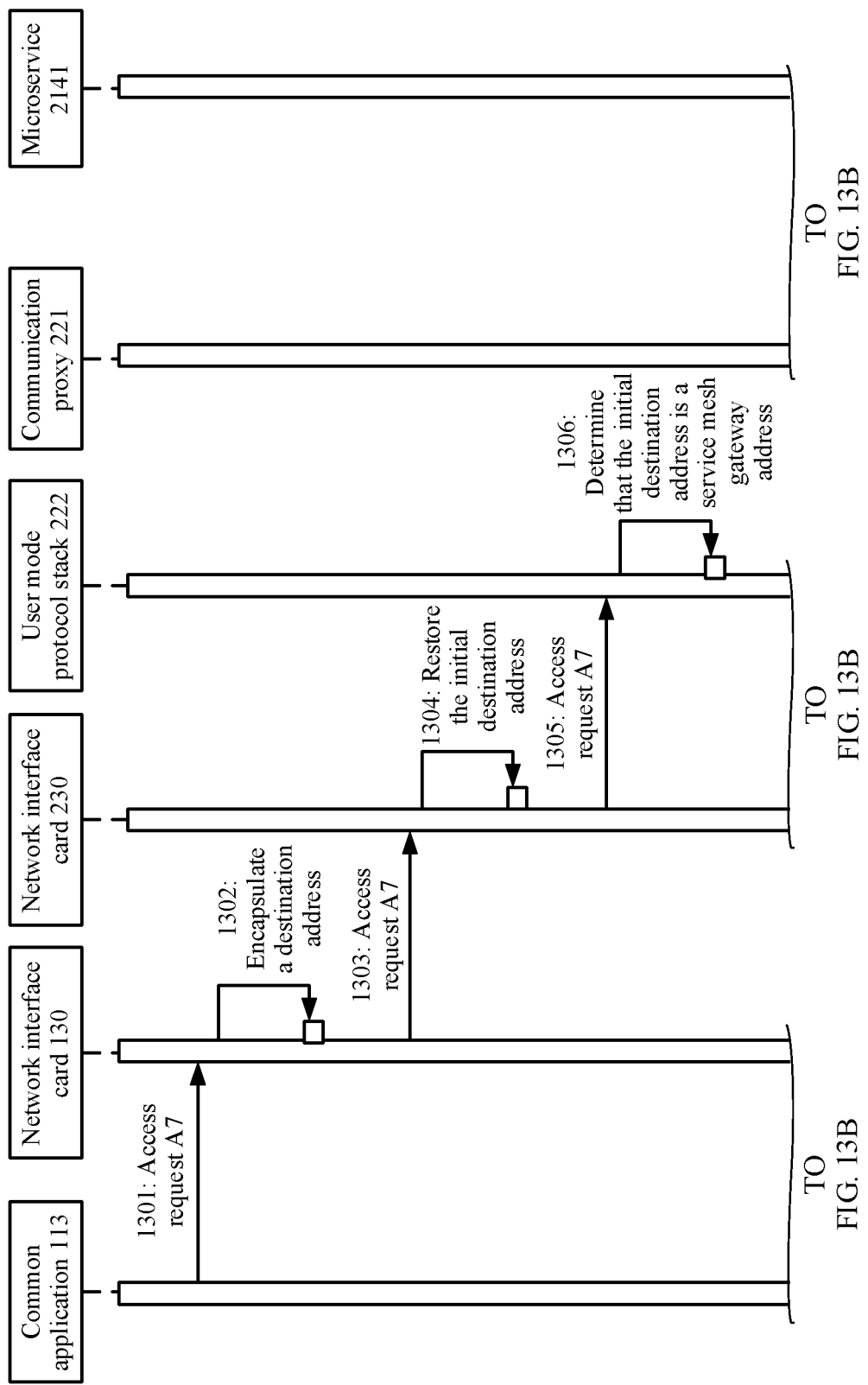

MICROSERVICE-BASED SERVICE MESH SYSTEM AND SERVICE ORIENTED ARCHITECTURE GOVERNANCE METHOD

CROSS-REFERENCE TO RELATED APPLICATIONS

This is a continuation of International Patent Application No. PCT/CN2021/120838 filed on Sep. 27, 2021, which claims priority to Chinese Patent Application No. 202011050249.5 filed on Sep. 29, 2020 and Chinese Patent Application No. 202011641555.6 filed on Dec. 31, 2020. All of the aforementioned patent applications are hereby incorporated by reference in their entireties.

TECHNICAL FIELD

This disclosure relates to the data processing field, and in particular, to a microservice-based service mesh system and service-oriented architecture (SOA) governance method.

BACKGROUND

A service mesh technology is an application network technology based on an Internet Protocol (IP) network. Based on the service mesh technology, discovery and routing between services are not directly based on an IP address, but based on service metadata information (including but not limited to a service name and a service version). The service mesh technology separates non-functional SOA governance logic of a distributed application in a microservice architecture from a service process to a sidecar, and provides connection, security, flow control, gray release, and observation capabilities between services in a non-intrusive manner, to implement lightweight services and infrastructure-based SOA governance.

With development of user requirements, a microservice scale and microservice calling complexity are increased rapidly. How to efficiently govern a microservice in a continuous running phase is an important problem in service mesh technology evolution.

SUMMARY

Embodiments of this disclosure provide a microservice-based service mesh system and SOA governance method, to perform SOA governance on an access request using a data card independent of a host, thereby saving host resources and improving SOA governance efficiency.

According to a first aspect, an embodiment of this disclosure provides a microservice-based service mesh system, including a first node. The first node includes a first host and a first data card. The first data card is inserted into the first host. A first data channel is established between the first data card and the first host. A first pod runs on the first host. The first pod is provided with a first microservice. The first data card accesses a network, receives, using the network, an SOA governance policy sent by a management and control node, and performs, based on the SOA governance policy, SOA governance on a first access request sent by the first host to the first data card through the first data channel. The first access request is an access request that is of the first microservice for a second microservice and that is obtained by the first host from the first pod.

In other words, a node in the service mesh system can perform SOA governance on an access request using a peripheral device of a host, thereby preventing SOA governance for the access request from occupying host resources, and improving SOA governance efficiency.

In a possible implementation, the SOA governance policy includes a correspondence between the second microservice and a network address of a second pod running the second microservice. The first data card is configured to: determine, based on the SOA governance policy, the network address of the second pod running the second microservice, set a destination address of the first access request to the network address of the second pod, determine that the second pod is disposed on the first host, and send a modified first access request to the second pod through the first data channel.

In other words, in this implementation, a data card can perform SOA governance on a call between different microservices on a same node.

In a possible implementation, the SOA governance policy further includes a correspondence between a third microservice and a network address of a third pod running the third microservice. The first host is further configured to: obtain, from the first pod, a second access request of the first microservice for the third microservice, and send the second access request to the first data card through the first data channel. The first data card is configured to: determine, based on the SOA governance policy, the network address of the third pod running the third microservice, set a destination address of the second access request to the network address of the third pod, determine that the third pod is not disposed on the first host, and send the second access request using the network.

In other words, in this implementation, the data card can perform SOA governance on a call between microservices on different nodes.

In a possible implementation, the first node further includes a first network interface card. The first network interface card is connected to the first data card. The first data card accesses the network using the first network interface card. The first data card is configured to send the second access request to the first network interface card. The first network interface card is configured to send the second access request using the network.

In other words, in this implementation, the data card can exchange information with the network using a specially disposed network interface card, thereby reducing overheads of data card resources caused by information exchange between the data card and the outside.

In a possible implementation, the service mesh system further includes a second node. The second node includes a second host, a second data card, and a second network interface card. The second data card is inserted into the second host. A second data channel is established between the second data card and the second host. The third pod runs on the second host. The second network interface card is connected to the second data card. The second network interface card accesses the network. The first data card is further configured to: when determining that the third pod is not disposed on the first host, set a service mesh identifier for the second access request. The second network interface card is configured to: receive the second access request sent by the first network interface card, and when determining that the second access request carries the service mesh identifier, send the second access request to the second data card. The second data card is configured to: when determining that the third pod is disposed on the second host, send the second access request to the third pod through the second data channel.

In other words, in this implementation, the first data card can add the service mesh identifier to an access request used to request to access the microservice. Therefore, a peer device can quickly determine, based on whether the access request carries the service mesh identifier, whether the access request is used to access the microservice.

In a possible implementation, the service mesh system further includes a third node. The third node includes a third host. The third host and the first host access the network. A first application runs on the first host. A second application runs on the third host. The first host is configured to: obtain a third access request of the first application for a network address of the second application, and when determining that the second application does not run on the first host, send the third access request using the network. The third host is configured to: receive the third access request sent by the first host, and send the third access request to the second application.

In other words, in this implementation, the service mesh system can implement a call between common applications on different nodes.

In a possible implementation, a first application and a second application run on the first host. The first host is configured to: obtain a third access request of the first application for a network address of the second application, and when determining that the second application runs on the first host, send the third access request to the second application.

In other words, in this implementation, the service mesh system can implement a call between different common applications on a same node.

In a possible implementation, the service mesh system further includes a third node. The third node includes a third host and a third data card. The third data card is inserted into the third host. A third data channel is established between the third data card and the third host. A fourth pod runs on the third host. The fourth pod is provided with a fourth microservice. The third data card and the first host access the network. A first application runs on the first host. The first host is configured to: obtain a fourth access request of the first application for a network address of the third data card, and send the fourth access request using the network. The third data card is configured to: receive the fourth access request sent by the first host, and send the fourth access request to the fourth microservice through the third data channel based on an identifier that is of the fourth microservice and that is carried in the fourth access request.

In other words, in this implementation, the service mesh system can implement a call of the common application for the microservice using the data card.

In a possible implementation, the service mesh system further includes a third node. The third node includes a third host. A third application runs on the third host. The third host accesses the network. The first host is configured to: obtain a fifth access request of the first microservice for a network address of the third application, and send the fifth access request to the first data card through the first data channel. The first data card is configured to send the fifth access request using the network. The third host is configured to: receive the fifth access request, and send the fifth access request to the third application.

In other words, in this implementation, the service mesh system can implement a call of the microservice for the common application using the data card.

According to a second aspect, an embodiment of this disclosure provides a microservice-based SOA governance method. The method is applied to a microservice-based service mesh system. The service mesh system includes a first node. The first node includes a first host and a first data card. The first data card is inserted into the first host. A first data channel is established between the first data card and the first host. A first pod runs on the first host. The first pod is provided with a first microservice. The first data card accesses a network. The method includes: the first data card receives, using the network, an SOA governance policy sent by a management and control node. The first data card performs, based on the SOA governance policy, SOA governance on a first access request sent by the first host to the first data card through the first data channel. The first access request is an access request that is of the first microservice for a second microservice and that is obtained by the first host from the first pod.

In a possible implementation, the SOA governance policy includes a correspondence between the second microservice and a network address of a second pod running the second microservice. That the first data card performs, based on the SOA governance policy, SOA governance on a first access request sent by the first host to the first data card through the first data channel includes: the first data card determines, based on the SOA governance policy, the network address of the second pod running the second microservice, and sets a destination address of the first access request to the network address of the second pod. The first data card determines that the second pod is disposed on the first host, and sends the modified first access request to the second pod through the first data channel.

In a possible implementation, the SOA governance policy further includes a correspondence between a third microservice and a network address of a third pod running the third microservice. The method further includes: the first host obtains, from the first pod, a second access request of the first microservice for the third microservice, and sends the second access request to the first data card through the first data channel. The first data card determines, based on the SOA governance policy, the network address of the third pod running the third microservice, and sets a destination address of the second access request to the network address of the third pod. The first data card determines that the third pod is not disposed on the first host, and sends the second access request using the network.

In a possible implementation, the first node further includes a first network interface card. The first network interface card is connected to the first data card. The first data card accesses the network using the first network interface card. That the first data card determines that the third pod is not disposed on the first host, and sends the second access request using the network includes: the first data card determines that the third pod is not disposed on the first host, and sends the second access request to the first network interface card. The first network interface card sends the second access request using the network.

In a possible implementation, the service mesh system further includes a second node. The second node includes a second host, a second data card, and a second network interface card. The second data card is inserted into the second host. A second data channel is established between the second data card and the second host. The third pod runs on the second host. The second network interface card is connected to the second data card. The second network interface card accesses the network. The method further includes: when determining that the third pod is not disposed on the first host, the first data card sets a service mesh identifier for the second access request. The second network interface card receives the second access request sent by the first network interface card, and when determining that the second access request carries the service mesh identifier, sends the second access request to the second data card. When determining that the third pod is disposed on the second host, the second data card sends the second access request to the third pod through the second data channel.

In a possible implementation, the service mesh system further includes a third node. The third node includes a third host. The third host and the first host access the network. A first application runs on the first host. A second application runs on the third host. The method further includes: the first host obtains a third access request of the first application for a network address of the second application, and when determining that the second application does not run on the first host, sends the third access request using the network. The third host receives the third access request sent by the first host, and sends the third access request to the second application.

In a possible implementation, a first application and a second application run on the first host. The method further includes: the first host obtains a third access request of the first application for a network address of the second application, and when determining that the second application runs on the first host, sends the third access request to the second application.

In a possible implementation, the service mesh system further includes a third node. The third node includes a third host and a third data card. The third data card is inserted into the third host. A third data channel is established between the third data card and the third host. A fourth pod runs on the third host. The fourth pod is provided with a fourth microservice. The third data card and the first host access the network. A first application runs on the first host. The method further includes: the first host obtains a fourth access request of the first application for a network address of the third data card, and sends the fourth access request using the network. The third data card receives the fourth access request sent by the first host, and sends the fourth access request to the fourth microservice through the third data channel based on an identifier that is of the fourth microservice and that is carried in the fourth access request.

In a possible implementation, the service mesh system further includes a third node. The third node includes a third host. A third application runs on the third host. The third host accesses the network. The method further includes: the first host obtains a fifth access request of the first microservice for a network address of the third application, and sends the fifth access request to the first data card through the first data channel. The first data card sends the fifth access request using the network. The third host receives the fifth access request, and sends the fifth access request to the third application.

It may be understood that the SOA governance method provided in the second aspect is the method performed by the node in the service mesh system provided in the first aspect. Therefore, for beneficial effects that can be achieved by the SOA governance method, refer to the foregoing corresponding beneficial effects.

According to a third aspect, an embodiment of this disclosure provides a network node, including a host and a data card. The data card is inserted into the host. The host includes a first processor and a first memory. The first memory is configured to store a first computer instruction. The data card includes a second processor and a second memory. The second memory is configured to store a second computer instruction. When the network node runs, the first processor executes the first computer instruction, and the second processor executes the second computer instruction, such that the network node performs the method provided in the second aspect.

According to a fourth aspect, an embodiment of this disclosure provides a computer storage medium. The computer storage medium includes computer instructions, and when the computer instructions are run on a network node, the network node is enabled to perform the method provided in the second aspect.

According to a fifth aspect, an embodiment of this disclosure provides a computer program product. When program code included in the computer program product is executed by a processor used in a network node, the method provided in the first aspect is implemented.

According to the service mesh system and the SOA governance method provided in embodiments of this disclosure, a data card capable of independently computing may be used to perform SOA governance on an access request used to call a service, such that the SOA governance no longer occupies computing resources of a host, thereby saving the computing resources of the host and improving SOA governance efficiency.

BRIEF DESCRIPTION OF DRAWINGS

FIG. 13A and FIG. 13B are a flowchart of application call according to an embodiment of this disclosure.

DESCRIPTION OF EMBODIMENTS

The following describes technical solutions in embodiments of the present disclosure with reference to accompanying drawings. It is clearly that the described embodiments are merely some rather than all of embodiments of this specification.

In the descriptions of this specification, "an embodiment", "some embodiments", or the like indicates that one or more embodiments of this specification include a feature, structure, or characteristic described with reference to embodiments. Therefore, statements such as "in one embodiment", "in some embodiments", "in some other embodiments", and "in still some other embodiments" that appear at different places in this specification do not necessarily refer to a same embodiment, but mean "one or more but not all embodiments", unless otherwise specially emphasized in another manner.

In the descriptions of this specification, "/" means "or" unless otherwise specified. For example, A/B may represent A or B. In this specification, "and/or" describes only an association relationship between associated objects and represents that three relationships may exist. For example, A and/or B may represent the following three cases: only A exists, both A and B exist, and only B exists. In addition, in the descriptions in embodiments of this specification, "a plurality of" means two or more than two.

In the descriptions of this specification, the terms "first" and "second" are merely intended for description, and shall not be understood as an indication or implication of relative importance or implicit indication of a quantity of indicated technical features. Therefore, a feature limited by "first" or "second" may explicitly or implicitly include one or more features. The terms "include", "contain", "have", and their variants all mean "include but are not limited to", unless otherwise emphasized in another manner.

A microservice architecture is an SOA that divides a complex system into a plurality of small services or applications. The small services or applications may be referred to as microservices. Each microservice is responsible for implementing independent service logic. The microservices are built based on service functions and can be deployed independently. The microservices depend on each other to provide a series of functions. The microservices are easily understood and modified, and provide flexibility in language and framework selection.

In the microservice architecture, SOA governance is a process used to manage adoption and implementation of the microservice architecture.

Figure 1:
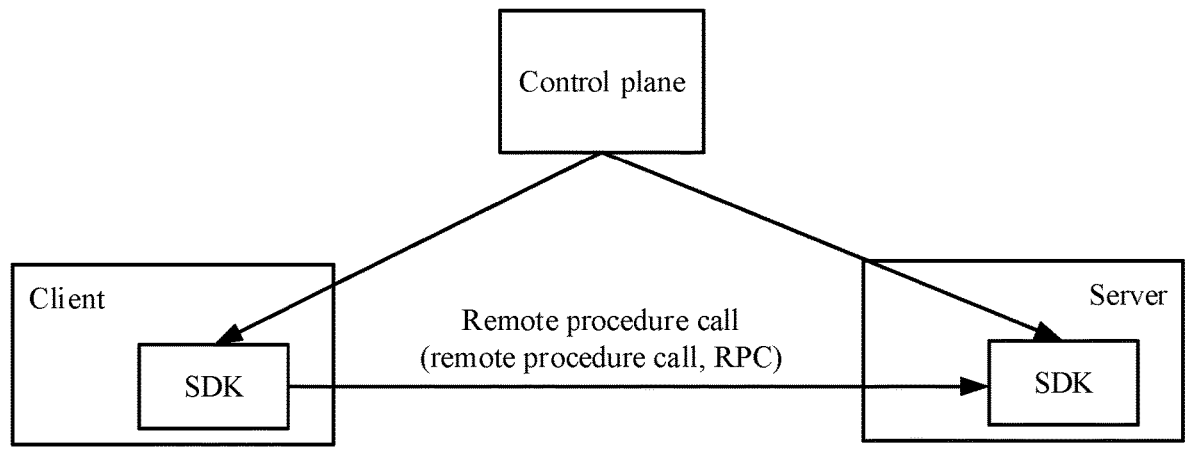
FIG. 1 shows an SOA governance framework.

FIG. 1 shows an SOA governance framework based on a software development kit (SDK). Typical applications of the framework include spring cloud and dubbo. In the framework, a client or a server provides an SOA governance function. The SOA governance function is usually implemented by the SDK. In a development phase of the framework, the SDK provided by the framework needs to be used to develop the client or the server. Generally, development of the framework supports only a programming language, for example, Java. The framework features high performance and easy debugging. However, an existing client or server in another programming language cannot be included in the framework, and it is difficult to reconstruct the framework, such that intrusive reconstruction is required. As a result, unnecessary risks and development costs are caused.

Figure 2:
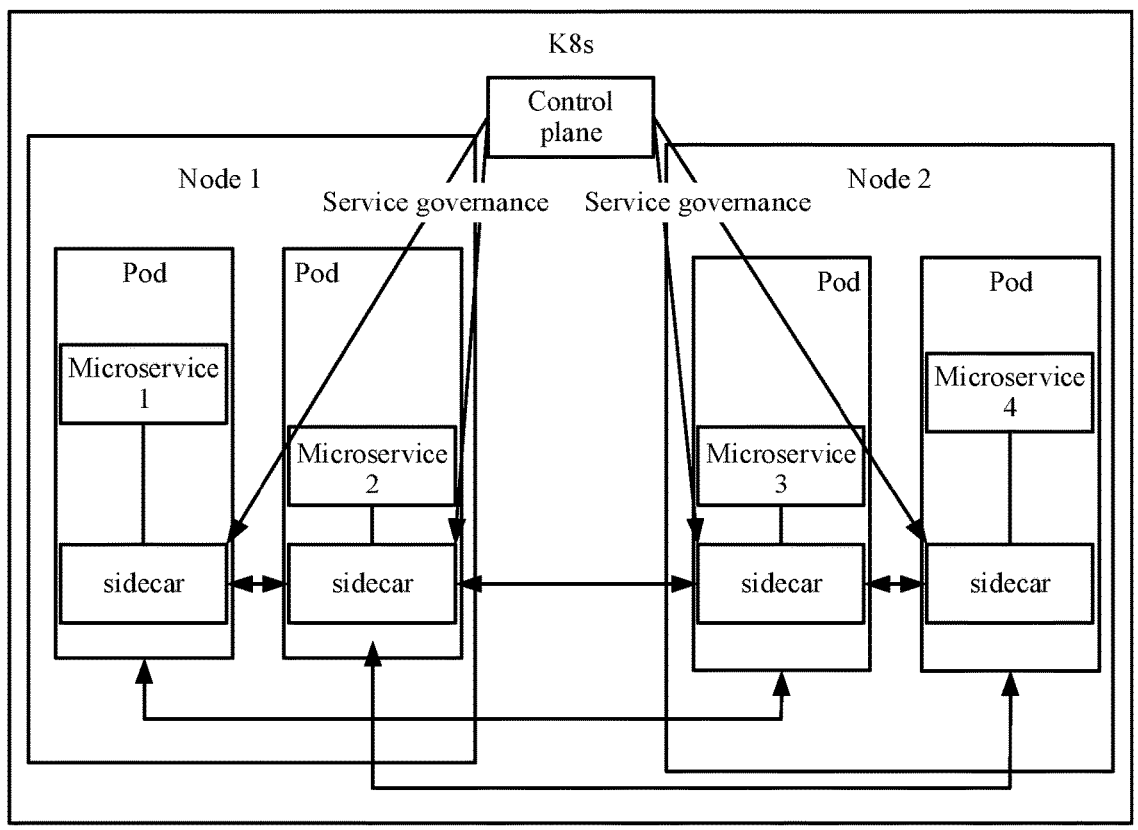
FIG. 2 shows a service mesh system.

FIG. 2 shows a system that can implement functions such as automatic deployment, automatic scaling, and maintenance of a container cluster. A container may be used to deploy or set a microservice.

The system shown in FIG. 2 uses a pod-level sidecar as a proxy of an application or a microservice, and may provide an SOA governance function transparent to a user, for example, link encryption, circuit breaker, traffic limiting, gray release, or link tracing. Different from other network proxies, Istio does not simply perform load balancing processing on a target IP address at a kernel or hardware layer, but a sidecar is responsible for discovery and load balancing of a target service. A calling end only needs to access a virtual address or logical address of a service. The sidecar determines how to convert service metadata into a network address that can be actually accessed, and sends traffic to a called microservice based on the network address.

Figure 3:
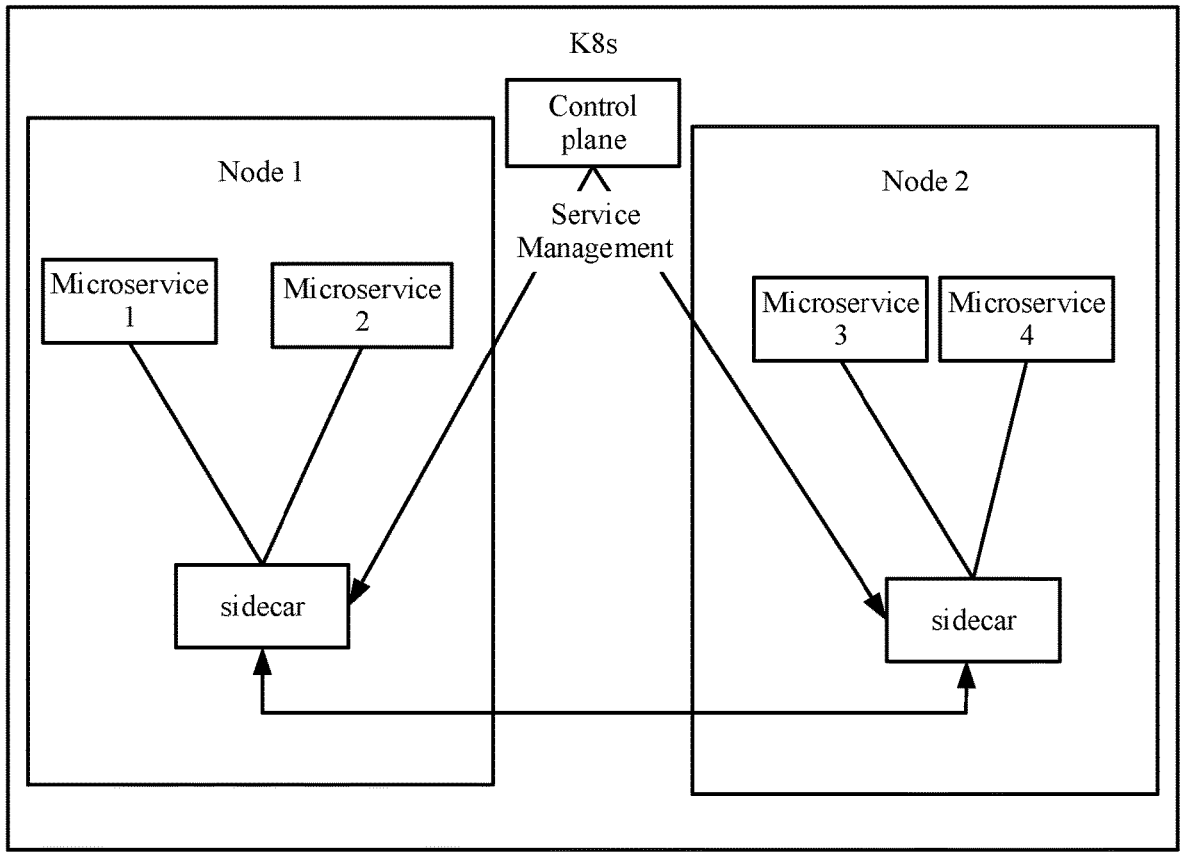
FIG. 3 shows a service mesh system.

FIG. 3 shows a system that may deploy a pod-level sidecar, or may deploy a node (node)-level sidecar.

Regardless of the system shown in FIG. 2 or the system shown in FIG. 3, the sidecar brings a transparent SOA governance capability, and also occupies excessive host resources (for example, a central processing unit (CPU) and a memory). Especially in a public cloud environment, a large quantity of pods need to be deployed, which brings extra overheads of the host resources. When services are busy, the sidecar and the microservice may preempt resources from each other. If the CPU is overloaded, input/output (I/O) cannot be processed in a timely manner. As a result, congestion may occur on the sidecar, and a delay of an entire link is increased.

Figure 4:
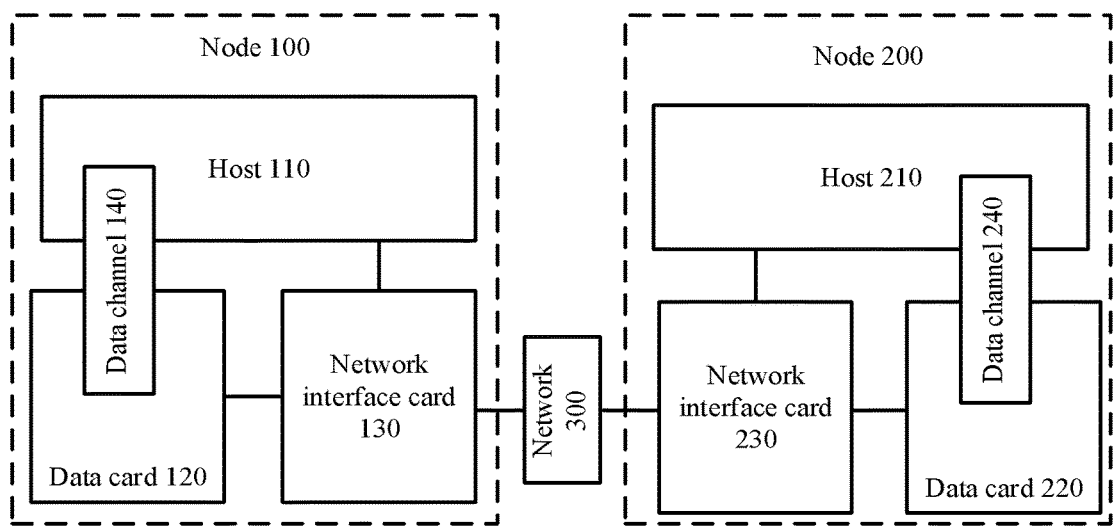
FIG. 4 shows a service mesh system according to an embodiment of this disclosure.

An embodiment of this disclosure provides a microservice-based service mesh system. Refer to FIG. 4. The service mesh system may include a node 100. The node 100 may include a host 110, a data card 120, and a network interface card 130.

The host 110 may be a physical machine, for example, a server. One or more pods may run on the host 110. Each pod can include one or more containers. For example, the pod may be a pod in K8s. One or more microservices may be deployed on the host 110. Each microservice may be set or run in a pod. The microservice may also be referred to as a microservice application, and may implement independent service logic. A plurality of microservices can provide corresponding service functions based on calling and called relationships.

The data card 120 is a hardware device having an independent computing resource. For example, the data card 120 has a dedicated processor, a dedicated memory, and the like. For example, the data card 120 may be a software defined infrastructure (SDI). The data card 120 may also be referred to as an SDI data card. The data card 120 may be used as a peripheral device of the host 110, and is inserted into the host 110. The data card 120 may perform SOA governance on an access request from the host 110. For example, a sidecar corresponding to a microservice on the host 110 may be deployed on the data card 120, such that the data card 120 can function as a sidecar. Because the computing resource of the data card 120 is independent of a computing resource of the host 110, the data card 120 plays a role of a sidecar, thereby preventing the sidecar from preempting the computing resource of the host 110 when performing SOA governance. In addition, the computing resource of the nearby data card 120 may be used during running of the sidecar, such that SOA governance efficiency can be improved, and a network delay can be reduced.

As shown in FIG. 4, a data channel 140 is established between the host 110 and the data card 120. The host 110 may send, to the data card 120 through the data channel 140, an access request on which SOA governance needs to be performed, such that the data card 120 performs SOA governance, for example, encryption and load balancing, on the access request. For example, the data channel 140 may be a Peripheral Component Interconnect Express (PCIe) bus, or the data channel 140 is carried on the PCIe bus. In an example, the data channel 140 may receive, based on a remote direct memory access (RDMA) technology, the access request sent by the host 110. The host 110 may directly transmit the access request to a storage area of the data card 120 through the data channel 140. Therefore, fast data transmission between a host and a data card is implemented, and a network delay is further reduced.

The network interface card 130 accesses a network 300, to send data to the network 300 and obtain data from the network 300. The network interface card 130 may be separately communicatively connected to the host 110 and the data card 120, such that the network interface card 130 may send data obtained from the host 110 or the data card 120 to the network 300, and send data obtained from the network 300 to the host 110 or the data card 120. For example, the network interface card 130 may be a peripheral device inserted into the host 110. In an example, the network interface card 130 is an SDI. The network interface card 130 may also be referred to as an SDI network interface card.

In some embodiments, the network interface card 130 and the data card 120 may be two independent hardware cards or hardware apparatuses. In some embodiments, the network interface card 130 and the data card 120 may be disposed on one hardware card or hardware apparatus.

In some embodiments, still refer to FIG. 4. The service mesh system may further include a node 200. For a host 210, a data card 220, a network interface card 230, and a data channel 240 included in the node 200, refer to the foregoing implementation of the host 110, the data card 120, the network interface card 130, and the data channel 140. Details are not described herein again.

The service mesh system may further include more nodes. For each node, refer to the implementation of the node 100. Details are not described herein again.

The foregoing describes an example of a structure of the service mesh system provided in this embodiment of this disclosure. Next, in different embodiments, an example of a function of a module or component in the service mesh system is described.

Figure 5A:
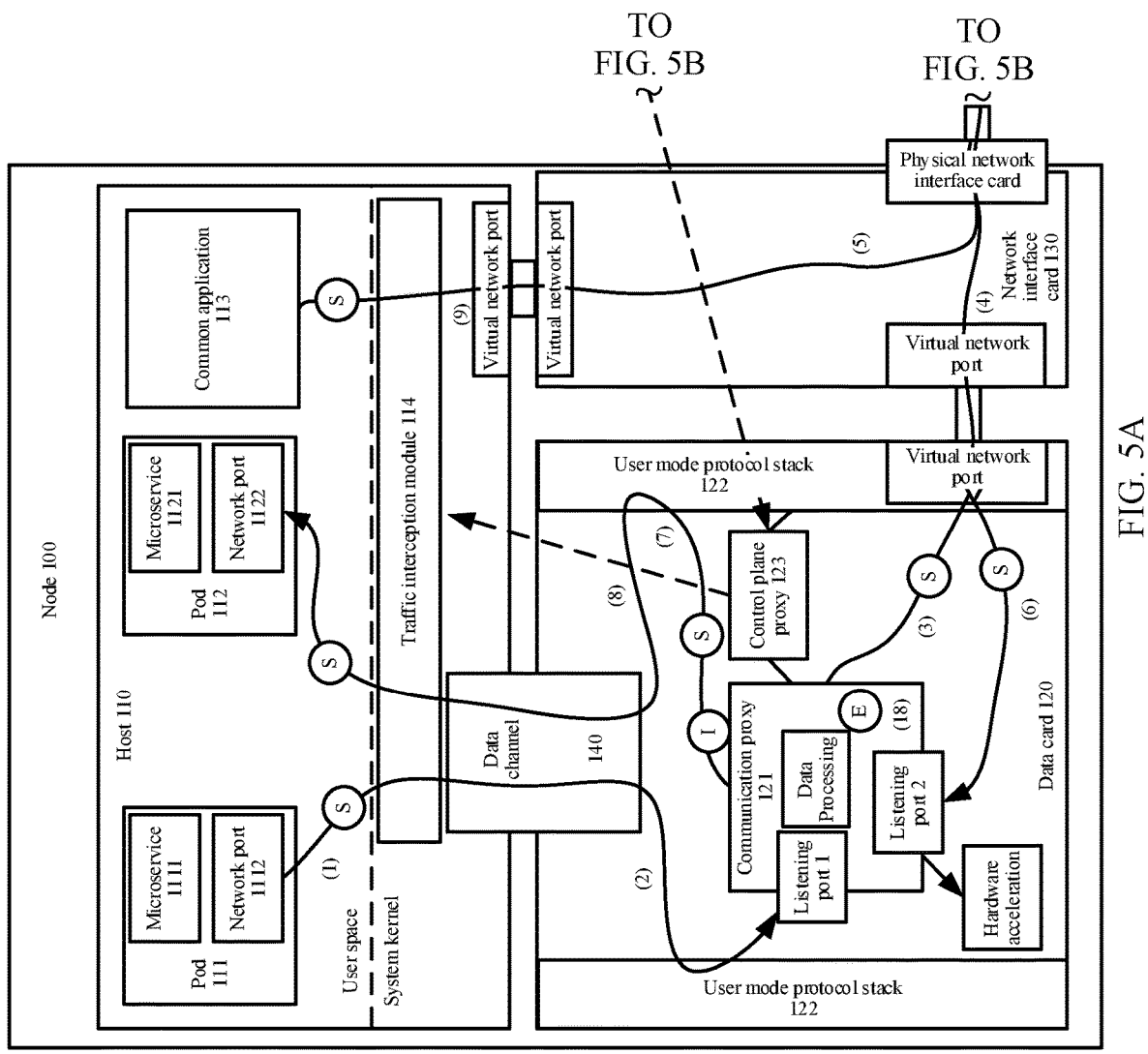
FIG. 5A and FIG. 5B are a flowchart of application call based on the service mesh system shown in FIG. 4.
Figure 5B:
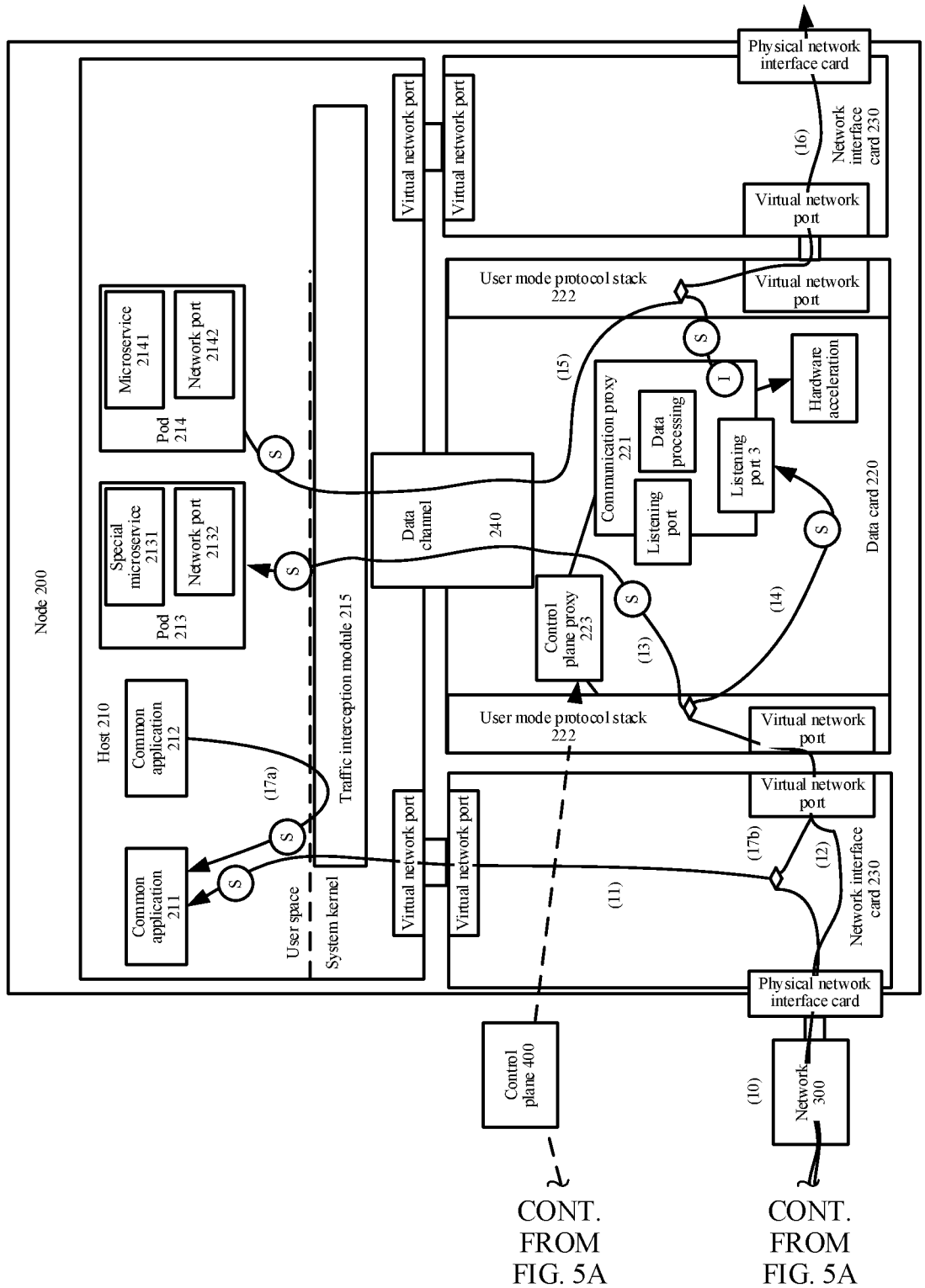

FIG. 5A and FIG. 5B are a flowchart of application call based on the service mesh system shown in FIG. 4.

As shown in FIG. 5A and FIG. 5B, one or more pods may be disposed in the host 110. An operating system (for example, Linux®) of the host 110 may be divided into user space and a system kernel. The one or more pods may run in the user space. The one or more pods may include a pod 111 and a pod 112. A microservice 1111 and a network port 1112 are disposed in the pod 111. The microservice 1111 may generate an access request, to call a service provided by another microservice or application. A service provided by the microservice 1111 may also be called by the other microservice or application. The microservice 1111 may send data to the outside or receive data from the outside through the network port 1112. A microservice 1121 and a network port 1122 are disposed in the pod 112. The microservice 1121 may generate an access request, to call a service provided by another microservice or application. A service provided by the microservice 1121 may also be called by the other microservice or application. The microservice 1121 may send data to the outside or receive data from the outside through the network port 1122.

A common application 113 may be further disposed in the host 110. The common application may be an application other than the microservice, for example, an application based on a Secure Shell Protocol (SSH) or an application based on a remote terminal protocol (telecommunication network (telnet)). The common application 113 may call a service provided by a microservice or another common application. A service provided by the common application 113 may also be called by the microservice or the other common application. In this embodiment of this disclosure, a common application may also be referred to as a common service.

A traffic interception module 114 may be further disposed in the host 110. The traffic interception module 114 may select an access request on which SOA governance needs to be performed, and send, to the data card 120 through the data channel 140, the access request on which SOA governance needs to be performed. The traffic interception module 114 may be disposed in the system kernel.

The access request generated by the microservice on the host 110 may include a service identifier. The access request is used to request to establish a network connection between the access request and a target application of the access request, such that the target application provides a service for the microservice that generates the access request. The target application of the access request may be another microservice or a common application. Generally, the service identifier may be a logical address or description information, and is not a network address of a microservice or application, or is not a network address of a pod running the microservice or application. The service identifier may be used to describe or identify a service. In other words, the service identifier is used to describe or represent a service requested by an access request in which the service identifier is located. In an example, the service identifier may include a service name, a service version number, and/or the like. In an example, the service identifier may be preset information used to declare or indicate that SOA governance needs to be performed on the access request. The traffic interception module 114 may have a governance-required list including a plurality of service identifiers. For example, the traffic interception module 114 may obtain the governance-required list from a control plane proxy. The governance-required list in the control plane proxy may be obtained from a control plane. In an example, the governance-required list may be generated by the control plane proxy. In another example, a developer or operation and maintenance personnel of the service mesh system can configure the governance-required list at the control plane.

In addition, it may be understood that, before SOA governance is performed on the access request on which SOA governance needs to be performed, the target application of the access request is not actually determined. An operation of SOA governance is determining the target application for the access request based on the service identifier in the access request.

The traffic interception module 114 obtains the access request from the user space of the host 110, and determines whether the service identifier in the access request is located in the governance-required list. If the service identifier in the access request is located in the governance-required list, it may be determined that the access request is an access request on which SOA governance needs to be performed, and the access request is sent to the data card 120. If the service identifier in the access request is not located in the governance-required list, it may be determined that SOA governance does not need to be performed on the access request, and the access request may be directly sent to the network 300 using the network interface card 130, such that the access request is sent to a corresponding node using the network 300. For example, a service identifier in an access request may be a network address of a common application, and the network address is not located in the governance-required list. The network interface card 130 may directly send the service request to a corresponding application based on the network address.

Still refer to FIG. 5A and FIG. 5B. The data card 120 may include a communication proxy 121, a user mode protocol stack 122, and a control plane proxy 123. The communication proxy 121 may perform SOA governance on the access request, for example, encrypt/decrypt the access request, and determine a microservice or an application that provides a service requested by the access request. For example, the communication proxy 121 may be a sidecar or have a function of a sidecar. In an example, the communication proxy 121 may be a sidecar in the K8s system or have a function of a sidecar in the K8s system.

The user mode protocol stack 122 may be configured to forward the access request to the communication proxy 121, and forward, to another module or component, the access request sent by the communication proxy 121. A function of the user mode protocol stack 122 is described in the following embodiments. Details are not described herein again.

The node 200 includes the host 210, the data card 220, the network interface card 230, and the data channel 240. A common application 211, a common application 212, a pod 213, and a pod 214 are disposed on a user space side of the host 210. A special microservice 2131 and a network port 2132 are disposed in the pod 213. A special microservice 2141 and a network port 2142 are disposed in the pod 214. A traffic interception module 215 is disposed on a system kernel side of the host 210. The data card 220 may be provided with a communication proxy 221, a user mode protocol stack 222, a control plane proxy 223, and the like. For functions of the components or modules in the node 200, refer to the foregoing descriptions of the corresponding components or modules in the node 100. Details are not described herein again.

Figure 6:
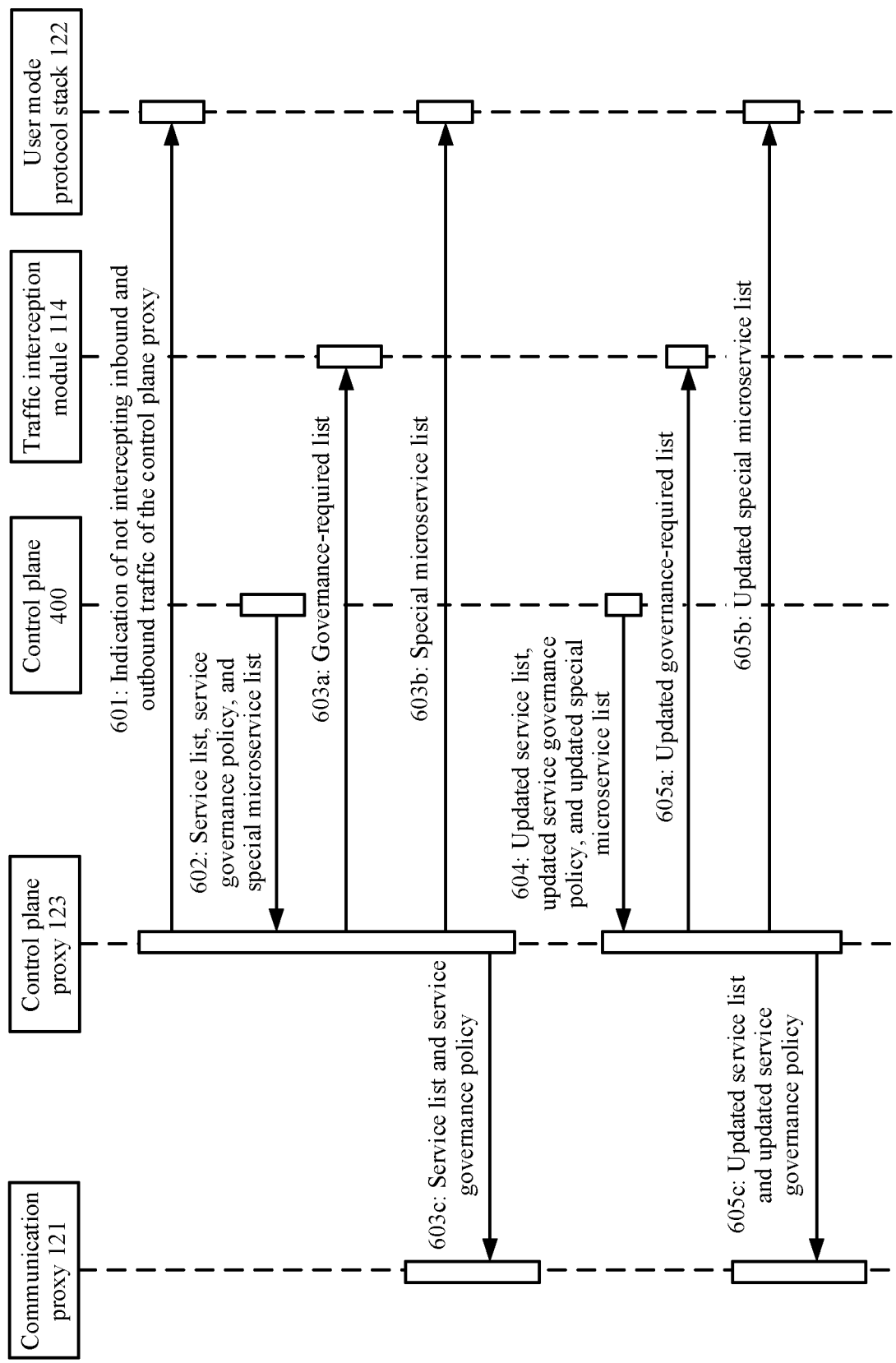
FIG. 6 is a flowchart of node initialization according to an embodiment of this disclosure.

After the service mesh system is started, the nodes in the service mesh system can be initialized. Refer to FIG. 6. The node 100 is used as an example, and initialization of the node 100 may include the following steps.

The control plane proxy 123 may perform step 601 of sending, to the user mode protocol stack 122, an indication of not intercepting inbound and outbound traffic of the control plane proxy. The inbound and outbound traffic of the control plane proxy 123 is data sent by the control plane proxy 123 and data received by the control plane proxy 123. The indication includes a user identity (UID) of the control plane proxy. The user mode protocol stack 122 may not intercept, based on the user identity of the control plane proxy, traffic (or data) sent by the control plane proxy, and not intercept traffic sent to the control plane. In other words, the user mode protocol stack 122 may identify the inbound and outbound traffic of the control plane proxy based on the user identity of the control plane proxy, and therefore may not intercept the inbound and outbound traffic of the control plane proxy 123, such that the inbound and outbound traffic of the control plane proxy 123 can freely pass through the user mode protocol stack 122.

The control plane proxy 123 may perform step 602 of receiving a service list, an SOA governance policy, and a special microservice list that are sent by the control plane 400.

The control plane 400 is a control plane in a service mesh. The control plane 400 may be referred to as a management and control node. Alternatively, the control plane 400 may be a program or a module that runs on the management and control node and that has a control and management function.

The service list may include a list of a correspondence between a service identifier and a network address of a microservice or an application that can provide a service corresponding to the service identifier. The microservice may register, on the control plane 400, a name of the microservice, a service identifier, a network address of a pod running the microservice, and the like. For example, the network address of the pod may include an IP address and a port number of the pod. Therefore, the control plane 400 may obtain the service list based on the correspondence between the service identifier constructing the microservice and the network address of the pod running the microservice.

In some embodiments, the service list may also be referred to as an SOA governance policy, or the SOA governance policy includes the service list.

In some embodiments, the SOA governance policy may include policies such as whether to encrypt or decrypt an access request, and whether to perform load balancing on an access request. In addition, for implementation of the SOA governance policy, refer to descriptions in other technologies. Details are not described herein again.

The special microservice list includes identification information of one or more special microservices. It may be understood that, generally, in the service mesh system, SOA governance needs to be performed twice on an access request used to request to connect to a microservice. One is SOA governance performed by a communication proxy at a transmit end (for example, the node 100), and the other is SOA governance performed by a communication proxy at a receive end (for example, the node 100). However, the special microservice is special. SOA governance needs to be performed only once on an access request used to request to connect to the special microservice.

Still refer to FIG. 6. The control plane proxy 123 may perform step 603a of sending the governance-required list to the traffic interception module 114. In some embodiments, the governance-required list may be configured by a developer or operation and maintenance personnel of the service mesh system. In some embodiments, the control plane proxy 123 may automatically generate the governance-required list based on the service list. As described above, the service list may include a list of a correspondence between a service identifier and a network address of a microservice or an application that can provide a service corresponding to the service identifier. The control plane proxy 123 may use the service identifier in the service list as the governance-required list. It should be noted that two manners of configuring the governance-required list are described above. However, during implementation of the solution provided in this embodiment of this disclosure, a manner of automatically generating the governance-required list based on the service list tends to be used, to further reduce dependency on manpower.

The control plane proxy 123 may perform step 603b of sending the special microservice list to the user mode protocol stack 122. When receiving an access request, the user mode protocol stack 122 may determine whether a microservice to which the access request is used to request to connect is located in the special microservice list. If the microservice to which the access request is used to request to connect is located in the special microservice list, the user mode protocol stack 122 does not send the access request to the communication proxy 121, but directly sends the access request to the host 110.

The control plane proxy 123 may further perform step 603c of sending the service list and the SOA governance policy to the communication proxy 121, such that the communication proxy 121 may perform SOA governance on the access request based on the service list and the SOA governance policy. A connection target application of the access request may be determined based on the service list using the service identifier in the access request. To be specific, a network address of the target application of the access request is determined. For example, if the SOA governance policy includes an encryption policy, the communication proxy 121 may encrypt the access request.

The control plane proxy 123 may further perform step 604 of receiving an updated service list, an updated SOA governance policy, and an updated special microservice list from the control plane 400.

The control plane proxy 123 may further perform step 605a of sending an updated governance-required list to the traffic interception module 114. In some embodiments, the updated governance-required list may be generated by the control plane proxy 123 based on the updated service list.

The control plane proxy 123 may further perform step 605b of sending the updated special microservice list to the user mode protocol stack 122.

The control plane proxy 123 may further perform step 605d of sending the updated service list and the updated SOA governance policy to the communication proxy 121.

Initialization of the node 100 may be implemented using the foregoing steps. For initialization of another node, refer to implementation of initialization of the node 100. Details are not described herein again.

After the foregoing initialization is performed on the node in the service mesh system, the following calling may be implemented.

(1) The microservice on the node 100 calls another microservice on the node 100.
(2) The microservice on the node 100 calls the microservice on the node 200.
(3) The common application on the node 100 calls the common application on the node 200.
(4) The microservice on the node 100 calls the special microservice on the node 200. The special microservice is described below. Details are not described herein again.
(5) The common application on the node 200 calls another common application on the node 200.
(6) The node 200 forwards the access request of the node 100.
(7) The common application on the node 100 calls the microservice on the node 200.
(8) The microservice on the node 100 calls the common application of the node 200.

Next, in different embodiments, the foregoing eight calling cases are described.

Embodiment 1

The Microservice on the Node 100 Calls Another Microservice on the Node 100

In this embodiment, an example in which the microservice 1111 calls the microservice 1121 is used for description. The microservice 1111 may generate an access request used to connect to the microservice 1121, to establish a communication connection between the microservice 1111 and the microservice 1121, such that the microservice 1121 can provide a related service for the microservice 1111. In this way, the microservice 1111 calls the microservice 1121. It may be understood that, in a microservice architecture, when generating the access request, the microservice 1111 does not actually know that the microservice 1111 needs to connect to the microservice 1121, but only knows which service required by the microservice 1111, and further adds a service identifier of the service to the access request, or uses the service identifier as an original destination address of the access request. After performing SOA governance on the access request, the communication proxy may determine a target application that actually provides a service for the microservice 1111, and then forward the access request to the target application, to establish a connection between the microservice 1111 and the target application.

Figure 7:
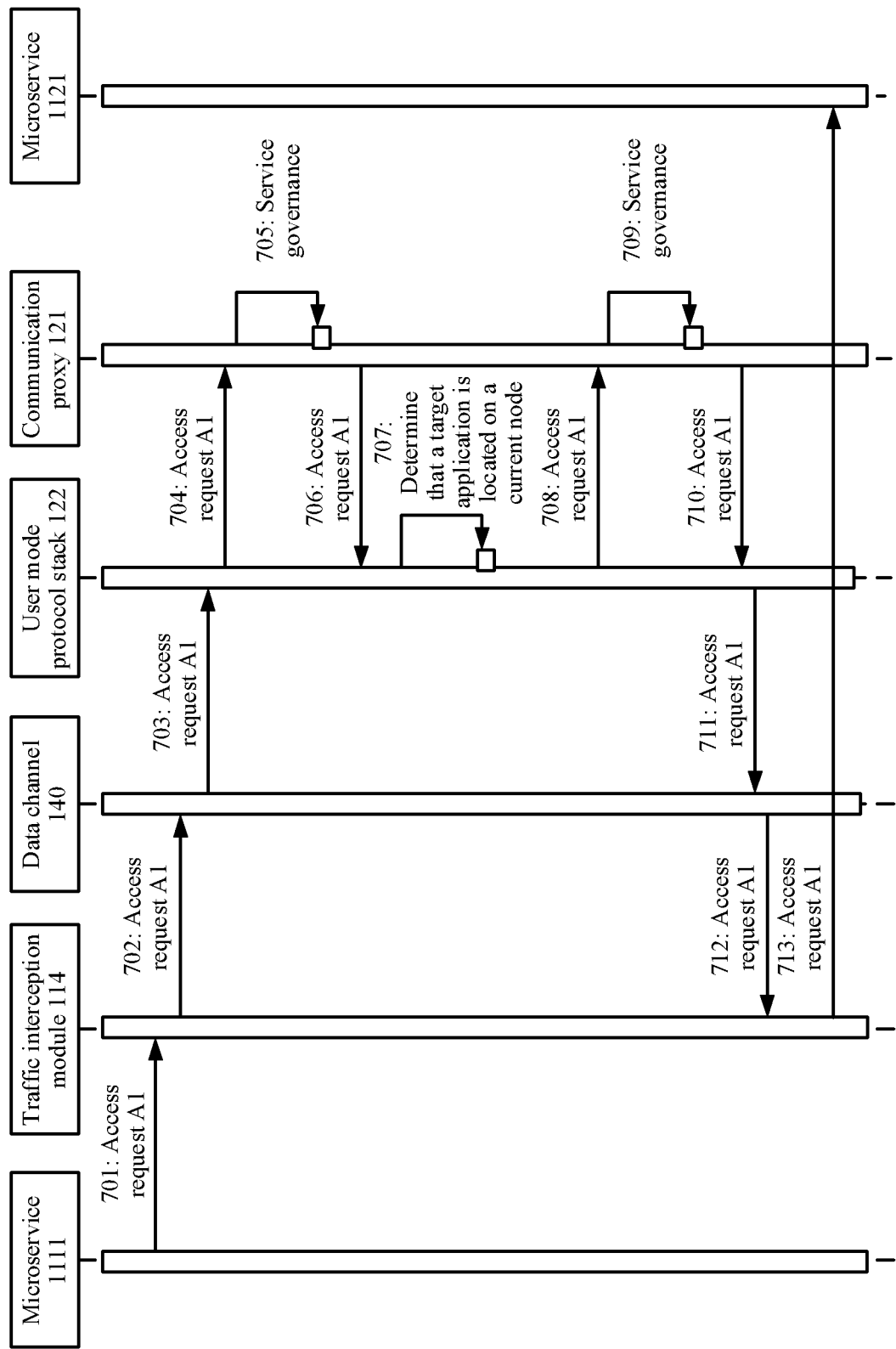
FIG. 7 is a flowchart of application call according to an embodiment of this disclosure.

Next, a data forwarding path on which the microservice 1111 calls the microservice 1121 is described with reference to FIG. 7 and FIG. 5A and FIG. 5B.

The microservice 1111 may generate an access request A1. The access request A1 may include a service identifier of a service that can be provided by the microservice 1121. For example, the access request A1 may be a network socket connection request. The service identifier in the access request A1 may be referred to as an original socket destination address (DST) of the access request A1. The microservice 1111 may perform step 701 of sending the access request A1 to the traffic interception module 114. The traffic interception module 114 may determine, based on the service identifier in the access request A1 using the governance-required list, whether SOA governance needs to be performed on the access request A1. If the service identifier in the access request A1 is a service identifier corresponding to the microservice 1121, and the service identifier is located in the governance-required list, it is determined that SOA governance needs to be performed on the access request A1. Therefore, the traffic interception module 114 may perform step 702 of forwarding the access request A1 to the data channel 140.

In an illustrative example, a data flow in step 701 and step 702 may be shown in (1) in FIG. 5A. The access request A1 that may be generated by the microservice 1111 may be a network socket connection request. The service identifier in the access request A1 may be used as an original socket destination address of the socket connection. The access request A1 may be sent to the traffic interception module 114. The traffic interception module 114 learns, through analysis, that the service corresponding to the service identifier is a service in the service mesh. In other words, SOA governance needs to be performed on the service corresponding to the service identifier. The traffic interception module 114 forwards the access request A1 to the data channel 140.

The data channel 140 may perform step 703 of sending the access request A1 to the user mode protocol stack 122. For step 703, refer to (2) in FIG. 5A. For example, as described above, the data channel 140 is a PCIe bus or is carried on a PCIe bus. In step 703, an end that is of the data channel 140 and that is located in the host 110 may convert the access request A1 into a data flow under a PCIe protocol, and transmit the converted data flow through the data channel 140. An end that is of the data channel 140 and that is located in the data card 120 may convert the access request A1 presented as the data flow under the PCIe protocol into a form of a socket connection request, and send the access request A1 to the user mode protocol stack 122. In addition, in this embodiment of this disclosure, the user mode protocol stack 122 is independent of a network protocol stack built in the operating system of the host 110. Therefore, system overheads caused by data exchange between the host 110 and the data card 120 can be avoided or reduced.

The user mode protocol stack 122 may perform step 704 of sending the access request A1 to the communication proxy 121. For step 704, refer to (2) in FIG. 5A. For example, the user mode protocol stack 122 may store the service identifier in the access request A1, that is, the original socket destination address of the access request A1. The user mode protocol stack 122 may update the socket destination address of the access request A1 to a network address of a listening port 1 of the communication proxy 121, and therefore may send the access request A1 to the listening port 1. In this case, a socket connection or a socket link between the microservice 1111 and the listening port 1 may be established. The listening port 1 may also be referred to as an outbound traffic (outbound) listening port of the communication proxy 121.

The communication proxy 121 may obtain the access request A1 through the listening port 1, and obtain the service identifier in the access request A1. It may be understood that the user mode protocol stack 122 is located on the socket link between the microservice 1111 and the listening port 1, and stores the service identifier in the access request A1. The communication proxy 121 may obtain the service identifier in the access request A1 from the user mode protocol stack 122 using the socket link.

The communication proxy 121 may perform step 705 of performing SOA governance on the access request A1. The communication proxy 121 may perform SOA governance based on the service identifier in the access request A1 and the SOA governance policy. The SOA governance may include selecting, through load balancing, an application that provides a service described by the service identifier for the microservice 1111. In this embodiment, it may be determined that the selected application that provides the service described by the service identifier for the microservice 1111 is the microservice 1121. In other words, it may be determined that the microservice 1121 is a target application of the access request A1. For example, when the target application of the access request A1 is determined, the socket destination address of the access request A1 may be updated to a network address of the microservice 1121. The network address of the microservice 1121 may be a network address of a pod running the microservice 1121, that is, a network address of the pod 112. For example, the network address of the pod 112 may include an IP address and a port number of the pod 112.

The communication proxy 121 may perform step 706 of sending the access request A1 to the user mode protocol stack 122. The user mode protocol stack 122 may perform step 707 of determining that the target application of the access request A1 is located on this node. Then, the user mode protocol stack 122 may perform step 708 of sending the access request A1 to a listening port 2 of the communication proxy 121. For details, refer to (3) and (6) in FIG. 5A. The user mode protocol stack 122 may determine, based on a UID of a sending process of the access request A1, that step 706 is performed by the communication proxy 121, and determine, based on the socket destination address in the access request A1, that the target application (namely, the microservice 1121) of the access request A1 is located on this node (namely, the node 100). Then, the user mode protocol stack 122 may determine that the user mode protocol stack 122 receives inbound traffic of the access request A1 in step 706, to forward the access request A1 to the listening port 2 of the communication proxy 121. This ensures that even if the microservice calls another local microservice, the microservice can symmetrically enter the communication proxy twice to perform SOA governance twice. The listening port 2 may be referred to as an inbound traffic (inbound) listening port of the communication proxy 121.

The communication proxy 121 may perform step 709 of performing SOA governance on the access request A1 received again. For example, in the SOA governance in step 705, service data or user data in the access request A1 is encrypted. In this case, in the SOA governance in step 709, encrypted data may be decrypted.

The communication proxy 121 may perform step 710 of sending, to the user mode protocol stack 122, the access request A1 on which SOA governance is performed again. Before performing step 710, the communication proxy 121 may call an application programming interface (API) provided by the user mode protocol stack 122 to add an SOA governance identifier to the access request A1. The SOA governance identifier is used to indicate that SOA governance is performed twice on the access request A1, and the target application is deployed locally.

The user mode protocol stack 122 may perform step 711 of sending the access request A1 to the data channel 140. Refer to (7) and (8) in FIG. 5A. When receiving the access request A1 sent in step 710, the user mode protocol stack 122 may determine, based on the SOA governance identifier carried in the access request A1, that the access request A1 is inbound traffic, and the target application is located in a pod of this node. Therefore, step 711 of sending the access request A1 to the data channel 140 may be performed.

The data channel 140 may perform step 712 of sending the access request A1 to the traffic interception module 114. Refer to (8) in FIG. 5A. When receiving the access request A1 sent in step 711, the end that is of the data channel 140 and that is located in the data card 120 may convert the access request A1 into the data flow under the PCIe protocol, and transmit the data flow under the PCIe protocol to the host 110. When the data flow under the PCIe arrives at the end that is of the data channel 140 and that is located in the host 110, the data flow under the PCIe may be converted into the socket connection request.

The traffic interception module 114 is an outbound traffic interception module. In other words, the traffic interception module 114 intercepts or filters only traffic sent by the host 110 to the outside, and does not filter traffic received by the host 110 from the outside. When receiving the access request A1 sent in step 712, the traffic interception module 114 may send the access request A1 to the target application (namely, the microservice 1121) based on the socket destination address (that is, the network address of the microservice 1121) of the access request A1. In this way, a socket connection between the microservice 1111 and the microservice 1121 may be established, such that the microservice 1111 calls the microservice 1121.

Embodiment 2

The Microservice on the Node 100 Calls the Microservice on the Node 200

In this embodiment, an example in which the microservice 1111 calls the microservice 2141 is used for description. The microservice 1111 may generate an access request used to connect to the microservice 2141, to establish a communication connection between the microservice 1111 and the microservice 2141, such that the microservice 2141 may provide a related service for the microservice 1111. In this way, the microservice 1111 calls the microservice 2141. It may be understood that, in a microservice architecture, when generating the access request, the microservice 1111 does not actually know that the microservice 1111 needs to connect to the microservice 2141, but only knows which service required by the microservice 1111, and further adds the service to the access request, or uses the service as an original destination address of the access request. After performing SOA governance on the access request, the communication proxy may determine a target application that actually provides a service for the microservice 1111, and then forward the access request to the target application, to establish a connection between the microservice 1111 and the target application.

Next, a data forwarding path on which the microservice 1111 calls the microservice 2141 is described with reference to FIG. 8A, FIG. 8B, FIG. 5A, and FIG. 5B.

The microservice 1111 may generate an access request A2. The access request A2 may include a service identifier of a service that can be provided by the microservice 2141. The microservice 1111 may perform step 801 of sending the access request A2 to the traffic interception module 114. The traffic interception module 114 may determine, based on the service identifier in the access request A2 using the governance-required list, whether SOA governance needs to be performed on the access request A2. The service identifier in the access request A2 is a service identifier corresponding to the microservice 2141, and the service identifier is located in the governance-required list. Therefore, it is determined that SOA governance needs to be performed on the access request A2. Therefore, the traffic interception module 114 may perform step 802 of forwarding the access request A2 to the data channel 140.

The data channel 140 may perform step 803 of sending the access request A2 to the user mode protocol stack 122.

The user mode protocol stack 122 may perform step 804 of sending the access request A2 to the communication proxy 121.

For execution of step 801, step 802, step 803, and step 804, refer to the foregoing descriptions of step 701, step 702, step 703, and step 704. Details are not described herein again.

The communication proxy 121 may perform step 805 of performing SOA governance on the access request A2. The communication proxy 121 may perform SOA governance based on the service identifier in the access request A2 and the SOA governance policy. The SOA governance may include selecting, through load balancing, an application that provides a service described by the service identifier for the microservice 1111. In this embodiment, it may be determined that the selected application that provides the service described by the service identifier for the microservice 1111 is the microservice 2141. In other words, it may be determined that the microservice 2141 is a target application of the access request A2. For example, when it is determined that the microservice 2141 is the target application of the access request A2, the socket destination address of the access request A2 may be updated to a network address of the microservice 2141. The special microservice 2141 may be referred to as the target application of the access request A2, and the network address of the special microservice 2141 may be referred to as a target application address of the access request A2. The network address of the microservice 2141 may be a network address of a pod running the microservice 2141, that is, a network address of the pod 214. For example, the network address of the pod 214 may include an IP address and a port number of the pod 214.

The communication proxy 121 may perform step 806 of sending the access request A2 to the user mode protocol stack 122. The user mode protocol stack 122 may perform step 807 of determining that an actual target application of the access request A2 is not located on this node. Then, the user mode protocol stack 122 may perform step 808 of adding a service mesh identifier to the access request A2. The service mesh identifier is used to indicate that the target application of the access request A2 is the microservice. A form of the service mesh identifier may be a customized field, number, or the like. During implementation, a developer or operation and maintenance personnel of the service mesh system may customize the service mesh identifier. The user mode protocol stack 122 may further perform step 809 of encapsulating the target application address of the access request A2. As described above, the target application address determined in step 805 is the network address of the microservice 2141. It may be understood that the microservice 2141 is located on a node (namely, the node 200). In step 809, the network address of the microservice 2141 may be encapsulated into an IP address of the node. For example, the network address of the microservice 2141 may be the network address of the pod 214. The network address of the pod 214 may include an IP address and a port number of the pod 214. If the pod 214 is located on the node 200, in step 809, the network address of the microservice 2141 is encapsulated into an IP address of the node 200.

In addition, for execution of step 806, step 807, step 808, and step 809, refer to (3) in FIG. 5A. In step 806, the access request A2 is used as the outbound traffic sent by the communication proxy 121, and sent to the user mode protocol stack 122. The user mode protocol stack 122 may determine, based on a UID of a data flow sending process of the access request A2, that the outbound traffic is sent by the communication proxy 121, and determine, based on the target application address of the access request A2, that the target application is not located on this node (the node 100). Then, service mesh identifier addition, target application address encapsulation, and the like may be performed on the access request A2.

Then, the user mode protocol stack 122 may perform step 810 of sending the access request A2 to the network interface card 130. Refer to (4) in FIG. 5A. When processing traffic sent to the outside, a network interface card may directly send the traffic to a network interface card of a target node using the network. Back to this embodiment, refer to FIG. 8A. The network interface card 130 may perform step 811 of sending the access request A2 to the network interface card 230. The network interface card 130 may send the access request A2 to the network interface card 230 using the network 300.

Figure 8A:
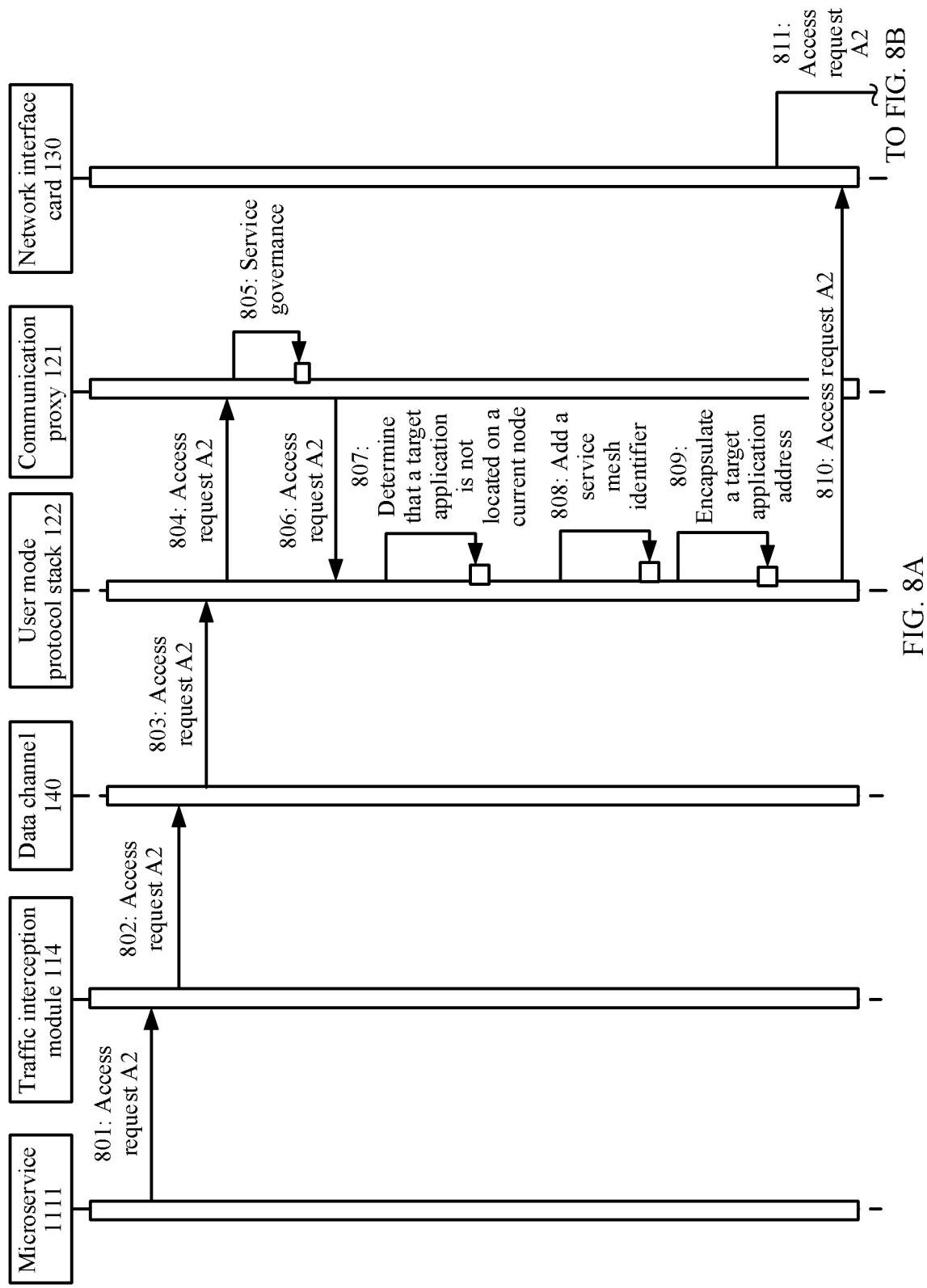
FIG. 8A and FIG. 8B are a flowchart of application call according to an embodiment of this disclosure.
Figure 8B:
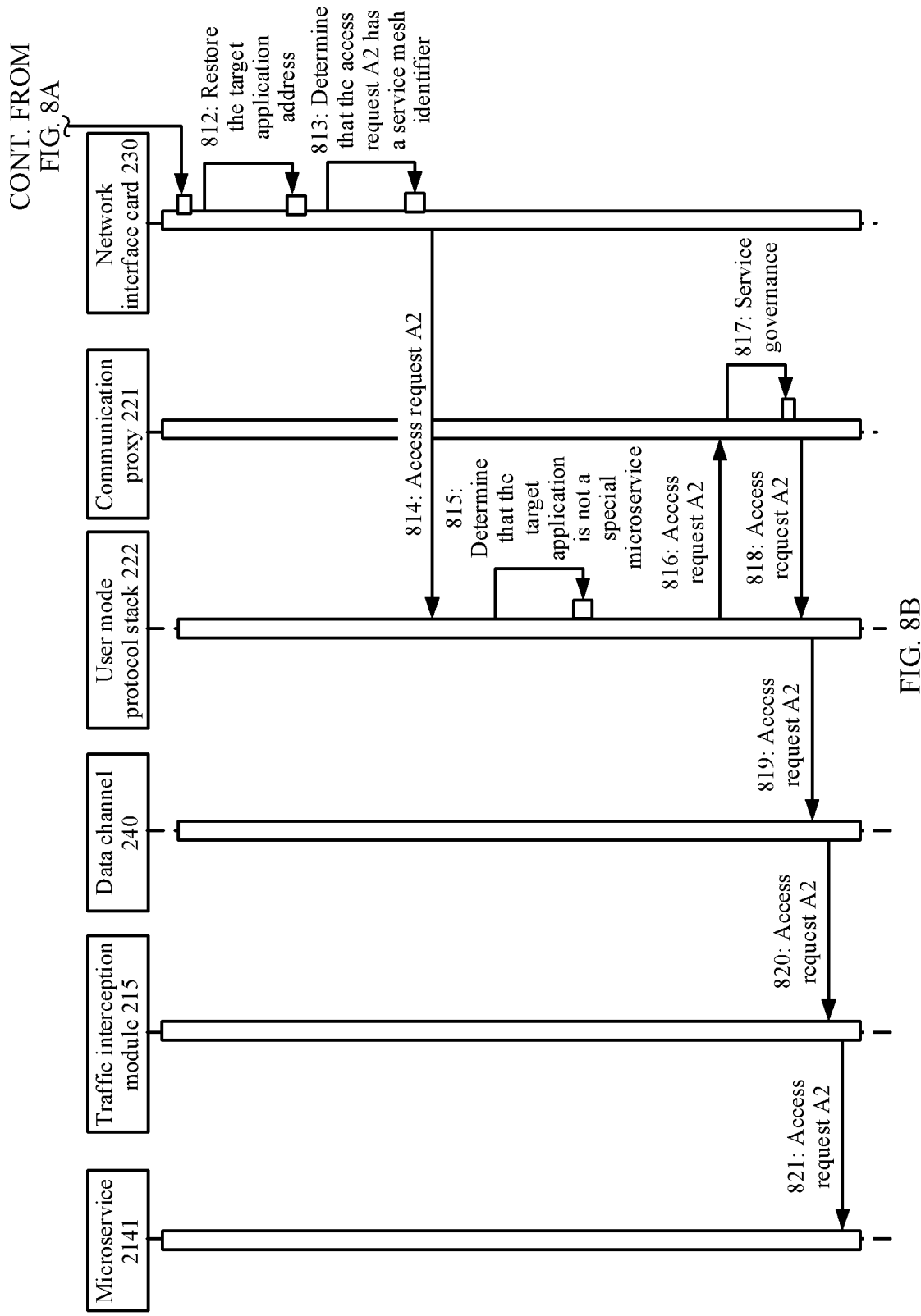

Refer to FIG. 8B. The network interface card 230 may perform step 812 of restoring the target application address from the access request A2, and perform step 813 of determining that the access request A2 has the service mesh identifier. Further refer to (10) in FIG. 5B. After receiving a data packet carrying the access request A2, a physical network interface card of the network interface card 230 may restore the target application address of the access request A2, and determine whether the access request A2 has the service mesh identifier.

Then, the network interface card 230 may perform step 814 of sending the access request A2 to the user mode protocol stack 222. Alternatively, refer to (12) in FIG. 5B. The network interface card 230 forwards the access request A2 to the user mode protocol stack 222 through a virtual network port between the network interface card 230 and the data card 220.

The user mode protocol stack 222 may perform step 815 of determining that the target application of the access request A2 is not a special microservice. As described above, in an initialization process, the user mode protocol stack may obtain the special microservice list. The special microservice list includes identification information of one or more special microservices. The identification information may be a network address. Therefore, in step 815, the user mode protocol stack 222 may determine, based on the network address of the target application, that the target application is not a special microservice, that is, determine that the network address of the target application is not located in the special microservice list. After determining that the target application of the access request A2 is not a special microservice, the user mode protocol stack 222 may perform step 816 of sending the access request A2 to the communication proxy 221. The communication proxy 221 may perform SOA governance on the access request A2 again. For example, service data in the access request A2 is decrypted. Then, the communication proxy 221 may perform step 818 of sending, to the user mode protocol stack 222, the access request A2 on which SOA governance is performed again. Before performing step 818, the communication proxy 221 may call an API provided by the user mode protocol stack 222 to add an SOA governance identifier to the access request A2. The SOA governance identifier is used to indicate that SOA governance is performed on the access request A2, and the target application is deployed locally (in a node on which the communication proxy 221 is located).

For execution of step 815 to step 818, further refer to (14) in FIG. 5B. If the user mode protocol stack 222 determines that the target application address of the access request A2 is not an address of a non-special microservice, that is, the target application is not a special microservice, the user mode protocol stack 222 forwards the access request A2 to a listening port 3 of the communication proxy 221. The listening port 3 is an inbound traffic listening port of the communication proxy 221. The communication proxy 221 records the access request A2 as inbound traffic, and performs SOA governance on the access request A2. When SOA governance is performed on the access request A2, and the access request A2 is sent to an upstream module or component, the API of the user mode protocol stack 222 may be called to add the SOA governance identifier to the access request A2.

The user mode protocol stack 222 may perform step 819 of sending the access request A2 to the data channel 240. Refer to (15) in FIG. 5B. When receiving the access request A2 sent in step 818, the user mode protocol stack 222 may determine, based on the SOA governance identifier carried in the access request A2, that the access request A2 is inbound traffic, and the target application is located in a pod of this node. Therefore, step 819 of sending the access request A2 to the data channel 240 may be performed.

The data channel 240 may perform step 820 of sending the access request A2 to the traffic interception module 215. Refer to (15) in FIG. 5B. When receiving the access request A2 sent in step 819, the end that is of the data channel 240 and that is located in the data card 120 may convert the access request A2 into the data flow under the PCIe protocol, and transmit the data flow under the PCIe protocol to the host 210. When the data flow under the PCIe arrives at the end that is of the data channel 240 and that is located in the host 210, the data flow under the PCIe may be converted into the socket connection request.

The traffic interception module 215 is an outbound traffic interception module. In other words, the traffic interception module 215 intercepts or filters only traffic sent by the host 210 to the outside, and does not filter traffic received by the host 210 from the outside. When receiving the access request A2 sent in step 820, the traffic interception module 215 may perform step 821 of sending the access request A2 to the microservice application 2141. The access request A2 may be sent to the target application (namely, the microservice 2141) based on the socket destination address (that is, the network address of the microservice 2141) of the access request A2.

Therefore, a connection between the microservice 1111 and the microservice 2141 may be established, such that the microservice 1111 calls the microservice 2141. For example, the access request A2 may be a socket connection request, and the established connection between the microservice 1111 and the microservice 2141 may be a socket connection.

Embodiment 3

The Common Application on the Node 100 Calls the Common Application on the Node 200

Figure 9:
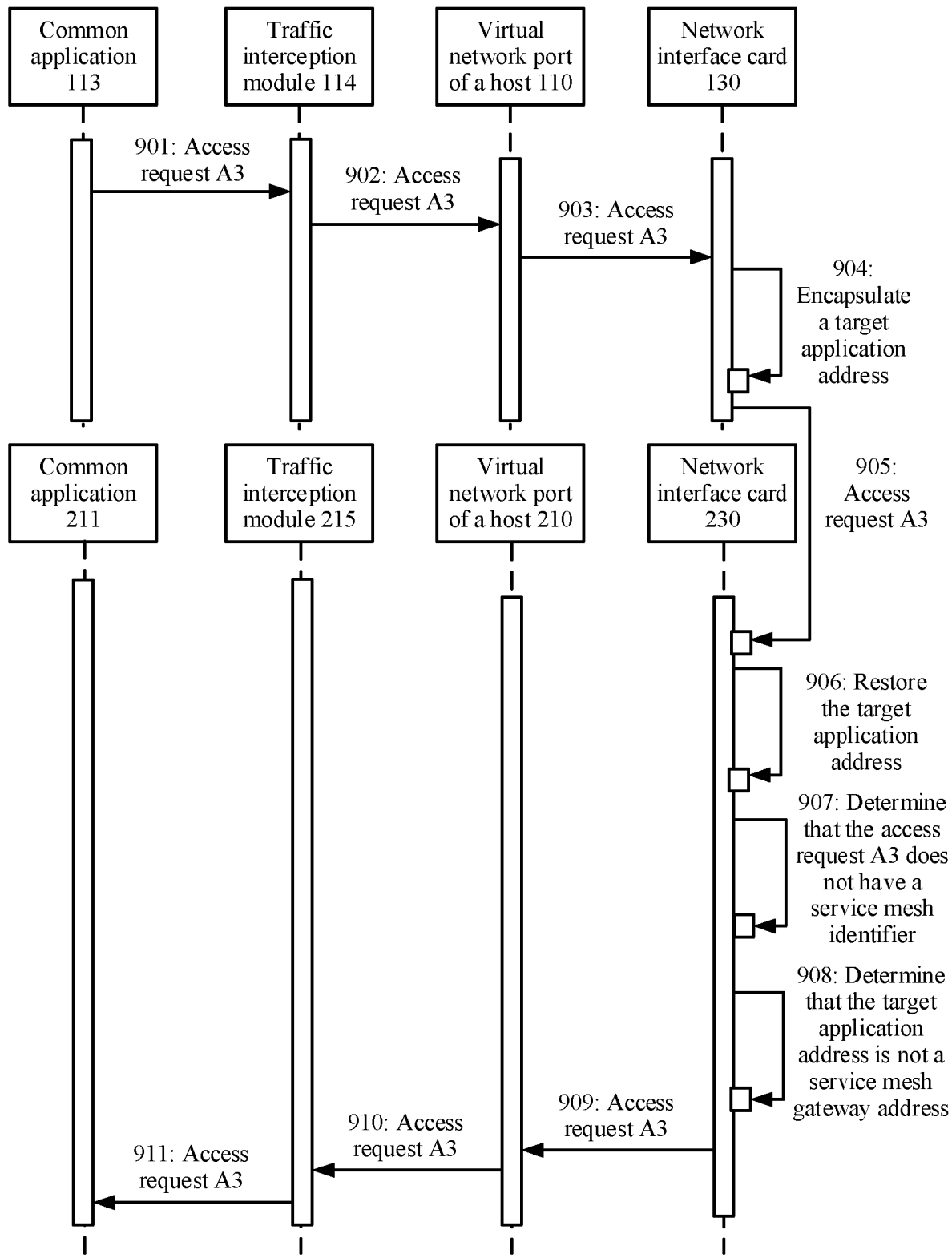
FIG. 9 is a flowchart of application call according to an embodiment of this disclosure.

Next, with reference to FIG. 9 and FIG. 5A and FIG. 5B, an example in which the common application 113 calls the common application 211 is used to describe the solution provided in this embodiment.

The common application 113 may generate an access request A3, and a target application address of the access request A3 is a network address of the common application 211. For example, the network address of the common application 211 may include an IP address and a port number of the common application 211. Refer to FIG. 9. The common application 113 may perform step 901 of sending the access request A3 to the traffic interception module 114. The traffic interception module 114 may determine that the network address of the common application is not located in the governance-required list, and may further perform step 902 of sending the access request A3 to a virtual network port of the host 110, such that the virtual network port of the host 110 may perform step 903 of sending the access request A3 to the network interface card 130. Further refer to (9) in FIG. 5A. The common application 113 may send the access request A3. The traffic interception module 114 determines that a target application of the access request A3 is the common application, and directly sends the access request to the network interface card 130 through the virtual network port.

The network interface card 130 may perform step 904 of encapsulating the target application address of the access request A3. As shown in (5) in FIG. 5A, when detecting that the target application of the access request A3 is located on a node other than the node 100, the network interface card 130 may encapsulate the target application address. The target application address may be encapsulated into an address of a node on which the target application is located. For example, the target application address is the network address of the common application 211, and the common application is located on the node 200, such that the network address may be encapsulated into the IP address of the node 200. For example, the network address of the common application 211 may include an IP address and a port number of the common application 211.

The network interface card 130 may further perform step 905 of sending the access request A3 to the network interface card 230. Refer to (5) in FIG. 5A. The network interface card 130 may send the access request A3 to the network 300 using a physical network interface card, and then the network 300 may forward the access request A3 to the network interface card 230 based on a destination address (that is, an address obtained after encapsulation in step 904) of the access request A3.

After receiving the access request A3, the network interface card 230 may perform step 906 of restoring the target application address of the access request A3. That is, in step 906, the target application address encapsulated in step 904 may be restored.

The network interface card 230 may perform step 907 of determining that the access request A3 does not have a service mesh identifier. It may be understood that the service request A3 does not pass through the data card 120, and therefore does not have the service mesh identifier. The network interface card 230 may further perform step 908 of determining that the target application address is not a service mesh gateway address. The service mesh gateway address is an address of a listening port of the communication proxy. For example, the listening port 3 in FIG. 5B may be used as a service mesh gateway address of the node 200. Then, the network interface card 230 may perform step 909 of sending the access request A3 to a virtual network port of the host 210. The virtual network port of the host 210 may perform step 910 of sending the access request A3 to the traffic interception module 215. The traffic interception module 215 may perform step 911 of sending the access request A3 to the common application 211.

For execution of step 907 to step 911, further refer to (11) in FIG. 5B. If the network interface card 230 may determine that the access request A3 does not have the service mesh identifier, and that the target application address is not the service mesh gateway address, the network interface card 230 may forward the access request A3 to the host 210 through the virtual network port. Then, the system kernel of the host 210 may directly send the access request A3 to the common application 211.

Therefore, a connection between the common application 113 and the common application 211 may be established, such that the common application 113 calls the common application 211. For example, the access request A3 may be a socket connection request, and the established connection between the common application 113 and the common application 211 may be a socket connection.

Embodiment 4

The Microservice on the Node 100 Calls the Special Microservice on the Node 200

The special microservice generally includes but is not limited to an application that can be connected without passing through a second communication proxy (for example, a sidecar). In other words, an access request whose target application is a special microservice can reach the target application without undergoing SOA governance for a second time, thereby implementing a connection between a source application and the target application. The source application is an application that generates the access request. A typical special microservice includes a microservice that provides a traffic limiting service, a microservice that provides a data collection service, or the like.

In a scenario of calling a special microservice, when an access request initiated by a microservice in user space of a host passes through a communication proxy for a first time, the communication proxy needs to actively call the special microservice to perform SOA governance on the access request. For example, the communication proxy can call the microservice that provides the traffic limiting service and determine whether the access request exceeds a traffic limiting threshold. If the access request exceeds the traffic limiting threshold, the communication proxy may return a failure response to the microservice that initiates the access request. When the access request passes through the communication proxy for the first time, the communication proxy may further call the data collection service, to report collected link calling data to the data collection service, for drawing a network calling topology diagram.

Because the special microservice is a microservice in the service mesh, it is difficult to configure, in the network interface card, an interception solution used to intercept an access request whose target application is the special microservice. As a result, an access request on which SOA governance is performed for a first time may be sent to the communication proxy again, causing unnecessary SOA governance. To resolve this problem, in this embodiment, whether the target application of the access request is the special microservice may be determined using the special microservice list in the user mode protocol stack, such that when the target application of the access request is not the special microservice, the access request may be directly sent to the host without passing through the communication proxy for the second time.

Next, with reference to FIG. 10A, FIG. 10B, FIG. 5A, and FIG. 5B, an example in which the microservice 1111 on the node 100 calls the special microservice 2131 on the node 200 is used to describe the solution in this embodiment.

The microservice 1111 may generate an access request A4. The access request A4 may include a service identifier of a service that can be provided by the special microservice 2131. The microservice 1111 may perform step 1001 of sending the access request A4 to the traffic interception module 114. The traffic interception module 114 may determine, based on the service identifier in the access request A4 using the governance-required list, whether SOA governance needs to be performed on the access request A4. The service identifier in the access request A4 is a service identifier corresponding to the special microservice 2131, and the service identifier is located in the governance-required list. Therefore, it is determined that SOA governance needs to be performed on the access request A4. Therefore, the traffic interception module 114 may perform step 1002 of forwarding the access request A4 to the data channel 140.

The data channel 140 may perform step 1003 of sending the access request A4 to the user mode protocol stack 122.

The user mode protocol stack 122 may perform step 1004 of sending the access request A4 to the communication proxy 121.

For execution of step 1001, step 1002, step 1003, and step 1004, refer to the foregoing descriptions of step 701, step 702, step 703, and step 704. Details are not described herein again.

The communication proxy 121 may perform step 1005 of performing SOA governance on the access request A4. The communication proxy 121 may perform SOA governance based on the service identifier in the access request A4 and the SOA governance policy. The SOA governance may include selecting, through load balancing, an application that provides a service described by the service identifier for the microservice 1111. In this embodiment, it may be determined that the selected application that provides the service described by the service identifier for the microservice 1111 is the special microservice 2131. In other words, it may be determined that the special microservice 2131 is a target application of the access request A4. For example, when it is determined that the special microservice 2131 is the target application of the access request A4, the socket destination address of the access request A4 may be updated to a network address of the special microservice 2131. The special microservice 2131 may be referred to as the target application of the access request A4, and the network address of the special microservice 2131 may be referred to as a target application address of the access request A4. The network address of the special microservice 2131 may be a network address of a pod running the special microservice 2131, that is, a network address of the pod 213. For example, the network address of the pod 213 may include an IP address and a port number of the pod 213.

The communication proxy 121 may perform step 1006 of sending the access request A4 to the user mode protocol stack 122. The user mode protocol stack 122 may perform step 1007 of determining that the target application of the access request A4 is not located on this node. Then, the user mode protocol stack 122 may perform step 1008 of adding a service mesh identifier to the access request A4. For the service mesh identifier, refer to the foregoing description of the embodiment shown in FIG. 8A and FIG. 8B. Details are not described herein again. The user mode protocol stack 122 may further perform step 1009 of encapsulating the target application address of the access request A4. As described above, the target application address determined in step 1005 is the network address of the special microservice 2131. It may be understood that the special microservice 2131 is located on a node (namely, the node 200). In step 1009, the network address of the special microservice 2131 may be encapsulated into an address of the node. For example, the network address of the special microservice 2131 may include the network address of the pod 213. The pod 213 is located on the node 200. In step 1009, the network address of the special microservice 2131 may be encapsulated into the IP address of the node 200.

In addition, for execution of step 1006, step 1007, step 1008, and step 1009, refer to (3) in FIG. 5A. In step 1006, the access request A4 is used as the outbound traffic sent by the communication proxy 121, and sent to the user mode protocol stack 122. The user mode protocol stack 122 may determine, based on a UID of a data flow sending process of the access request A4, that the outbound traffic is sent by the communication proxy 121, and determine, based on the target application address of the access request A4, that the target application is not located on this node (the node 100). Then, service mesh identifier addition, target application address encapsulation, and the like may be performed on the access request A4.

Then, the user mode protocol stack 122 may perform step 1010 of sending the access request A4 to the network interface card 130. Refer to (4) in FIG. 5A. When processing traffic sent to the outside, a network interface card may directly send the traffic to a network interface card of a target node using the network. Back to this embodiment, refer to FIG. 10A. The network interface card 130 may perform step 1011 of sending the access request A4 to the network interface card 230. The network interface card 130 may send the access request A4 to the network interface card 230 using the network 300.

Figure 10A:
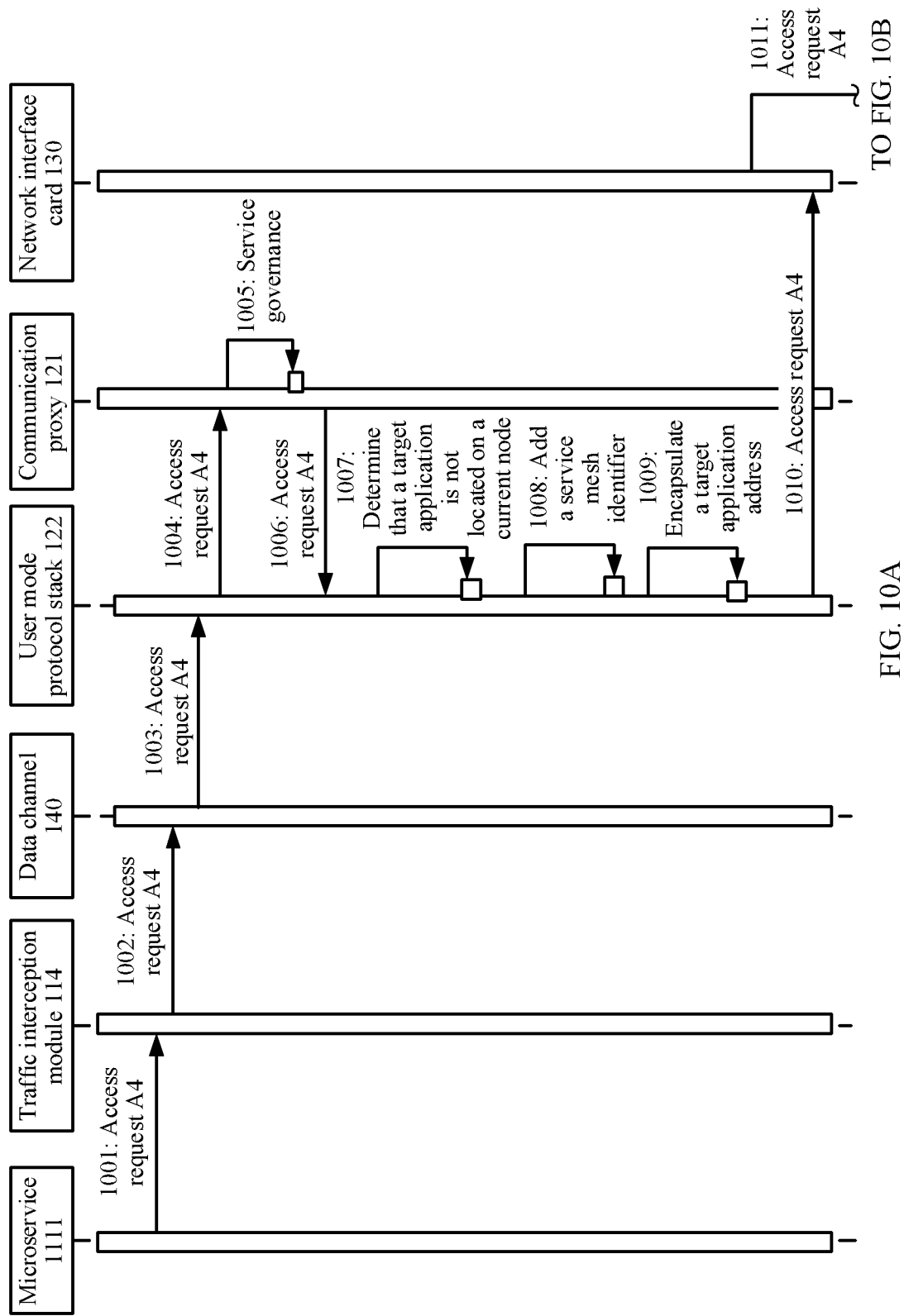
FIG. 10A and FIG. 10 are a flowchart of application call according to an embodiment of this disclosure.
Figure 10B:
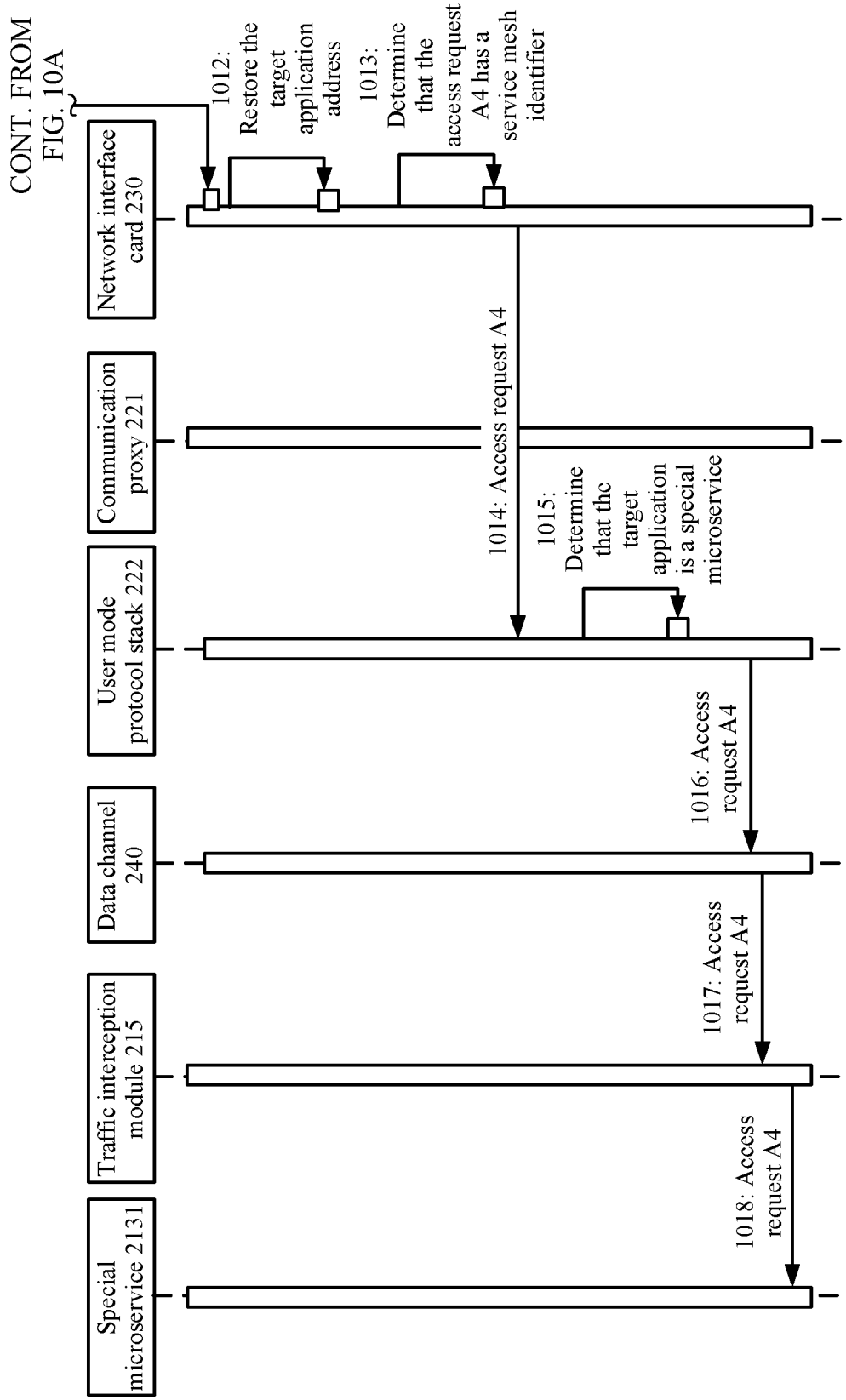

Refer to FIG. 10B. The network interface card 230 may perform step 1012 of restoring the target application address from the access request A4, and perform step 1013 of determining that the access request A4 has the service mesh identifier. Further refer to (10) in FIG. 5B. After receiving a data packet carrying the access request A4, a physical network interface card of the network interface card 230 may restore the target application address of the access request A4, and determine whether the access request A4 has the service mesh identifier.

Then, the network interface card 230 may perform step 1014 of sending the access request A4 to the user mode protocol stack 222. Alternatively, refer to (12) in FIG. 5B. The network interface card 230 forwards the access request A4 to the user mode protocol stack 222 through a virtual network port between the network interface card 230 and the data card 220.

The user mode protocol stack 222 may perform step 1015 of determining that the target application of the access request A4 is a special microservice. As described above, in an initialization process, the user mode protocol stack may obtain the special microservice list. The special microservice list includes identification information of one or more special microservices. The identification information may be a network address. Therefore, in step 1015, the user mode protocol stack 222 may determine, based on the network address of the target application, that the target application is a special microservice, that is, determine that the network address of the target application is located in the special microservice list.

After determining that the target application of the access request A4 is a special microservice, the user mode protocol stack 222 may perform step 1016 of sending the access request A4 to the data channel 240. The data channel 240 may perform step 1017 of sending the access request A4 to the traffic interception module 215. The traffic interception module 215 may perform step 1018 of sending the access request A4 to the special microservice 2131.

For execution of step 1016 to step 1018, refer to (13) in FIG. 5B. After determining that the target application of the access request A4 is the special microservice 2131, the user mode protocol stack 222 may directly send the access request A4 to the data channel 240. When the access request A4 is a socket connection request, and the end that is of the data channel 240 and that is located in the data card 120 receives the access request A4, the end may convert the access request A4 into the data flow under the PCIe protocol, and transmit the data flow under the PCIe protocol to the host 210. When the data flow under the PCIe arrives at the end that is of the data channel 240 and that is located in the host 210, the data flow under the PCIe may be converted into the access request A4 in a form of the socket connection request. The system kernel of the host 210 may directly send the access request A4 to the special microservice 2131.

Therefore, a connection between the microservice 1111 and the special microservice 2131 may be established, such that the microservice 1111 calls the special microservice 2131. For example, the access request A4 may be a socket connection request, and the established connection between the microservice 1111 and the special microservice 2131 may be a socket connection.

Embodiment 5: The Common Application on the Node 200 Calls Another Common Application on the Node 200

Figure 11:
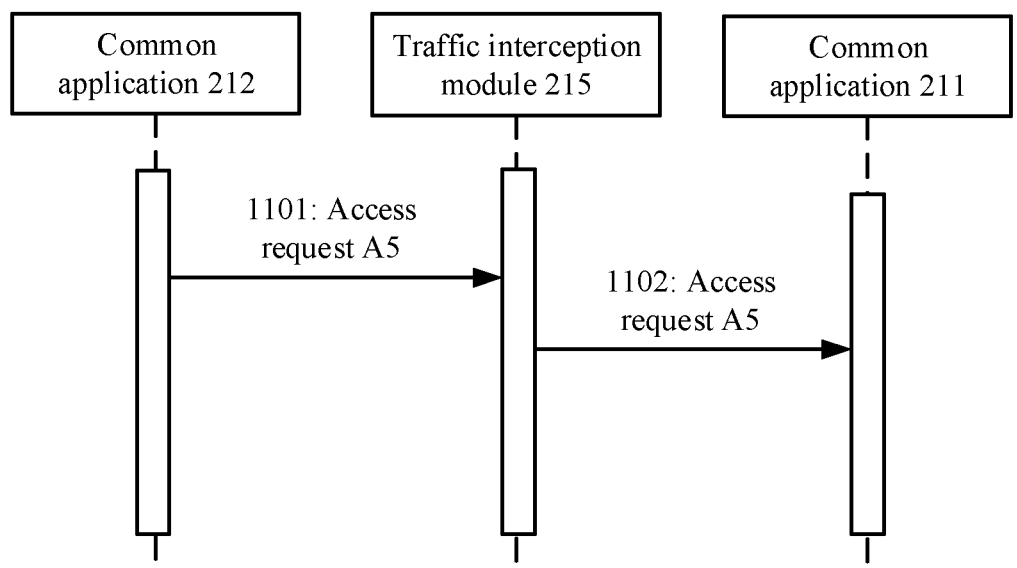
FIG. 11 is a flowchart of application call according to an embodiment of this disclosure.

Next, with reference to FIG. 11 and FIG. 5A and FIG. 5B, an example in which the common application 212 calls the common application 211 is used to describe the solution provided in this embodiment.

Refer to FIG. 11. The common application 212 may generate an access request A5, and a target application address of the access request A5 is a network address of the common application 211. The common application 212 may perform step 1101 of sending the access request A5 to the traffic interception module 215. The traffic interception module 215 may determine that a target application of the access request A5 is the common application 211. The traffic interception module 215 may perform step 1102 of sending the access request A5 to the common application 211.

Refer to (17a) in FIG. 5B. The target application of the access request initiated by the common application 212 is the common application 211. The traffic interception module 215 in the system kernel of the host 210 may determine that the target application to which the common application 212 requests to connect is the common application 211 on a local host, and may further directly send the access request initiated by the common application 212 to the common application 211.

Therefore, a connection between the common application 212 and the common application 211 may be established, such that the common application 212 calls the common application 211.

Embodiment 6

The Node 200 Forwards the Access Request of the Node 100

The service mesh system may further include a node 500. Due to a networking limitation, there is no direct communication connection between the node 100 and the node 500. As a result, it is difficult to directly send an access request sent by the microservice on the node 100 to the node 500. In this case, when the microservice on the node 100 needs to call an application (which may be a microservice or a common application) on the node 500, the node 200 may forward, to the node 500, the access request sent by the node 100. In other words, the node 200 may provide a relay service, to serve as a relay node between the node 100 and the node 500. The relay service is a service in the service mesh. In other words, the relay service may be provided by one or more microservices. In an example, the relay service may be provided by a communication proxy in a node.

Next, with reference to FIG. 12A, FIG. 12B, FIG. 5A, and FIG. 5B, an example in which the microservice 1111 calls a service on the node 500 is used to describe the solution provided in this embodiment.

The microservice 1111 may generate an access request A6 used to request to call the application on the node 500. For ease of description, the application that is on the node 500 and that is requested by the access request A6 to be called may be referred to as an application B. When there is no direct communication connection between the node 100 and the node 500, and the access request A6 is a socket connection request, the microservice 1111 may encapsulate a network address of the application B into a header in a layer C1 of the access request A6, and uses a service identifier of the relay service as a destination address in a layer C2 of the access request A6. The destination address in the layer C2 is a direct address of the access request A6, and a module or component on a forwarding path of the access request A6 may directly identify the destination address in the layer C2, and route the access request A6 based on the destination address. It may be understood that, in the service mesh system, when the microservice 1111 generates an access request, the destination address that is in the layer C2 and that is set by the microservice 1111 for the access request is a service identifier, and is not an address of a module or component. The service identifier is used to identify that SOA governance needs to be performed on the access request, such that the access request can be forwarded to the communication proxy based on the destination address in the layer C2. For example, the layer C2 may be a transport layer or a fourth layer in a network seven-layer protocol. The layer C1 is an upper layer of the layer C2. For example, the layer C1 may be an application layer or a seventh layer in the network seven-layer protocol.

The microservice 1111 may perform step 1201 of sending the access request A6 to the traffic interception module 114. The traffic interception module 114 may determine that a destination address in a transport layer of the access request A6, that is, the service identifier of the relay service, is located in the governance-required list, to determine that SOA governance needs to be performed on the access request A6.

The traffic interception module 114 may perform step 1202 of forwarding the access request A6 to the data channel 140. The data channel 140 may perform step 1203 of sending the access request A6 to the user mode protocol stack 122. The user mode protocol stack 122 may perform step 1204 of sending the access request A6 to the communication proxy 121.

For execution of step 1201, step 1202, step 1203, and step 1204, refer to the foregoing descriptions of step 701, step 702, step 703, and step 704, and the foregoing descriptions of (1) and (2) in FIG. 5A. Details are not described herein again.

The communication proxy 121 may perform step 1205 of performing SOA governance on the access request A6. The communication proxy 121 may perform SOA governance based on the service identifier in the layer C1 in the access request A6 and the SOA governance policy, to determine an application that provides the relay service for the access request A6. For example, it may be set that in step 1205, it is determined that the communication proxy 221 in the node 200 provides the relay service for the access request A6. In other words, it is determined that the communication proxy 221 is a target application of the access request A6, and a network address of the communication proxy 221 is a target application address of the access request A6. Then, the communication proxy 121 may update the destination address in the layer C2 of the access request A6 to the network address of the communication proxy 221. For example, the network address of the communication proxy 221 may be a network address of the listening port 3. The communication proxy 121 may send the updated access request A6 to the user mode protocol stack 122 in step 1206.

The user mode protocol stack 122 may perform step 1207 of determining that the target application of the access request A6 is not located on this node. The user mode protocol stack 122 may perform step 1208 of adding a service mesh identifier to the access request A6, and perform step 1209 of encapsulating the target application address of the access request A6. The network address of the communication proxy 221 may be encapsulated into the IP address of the node 200. The user mode protocol stack 122 may further perform step 1210 of sending the access request A6 whose address is encapsulated to the network interface card 130. The network interface card 130 may perform step 1211 of sending the access request A6 to the network interface card 230.

The network interface card 230 may perform step 1212 of restoring the target application address of the access request A6, and perform step 1213 of determining that the access request A6 has the service mesh identifier. Then, the network interface card 230 may perform step 1214 of sending the access request A6 to the user mode protocol stack 222.

The user mode protocol stack 222 may perform step 1215 of determining that the target application of the access request A6 is not a special microservice. Then, the user mode protocol stack 222 may send the access request A6 to the communication proxy 221 in step 1216.

For execution of step 1205 to step 1216, refer to the foregoing descriptions of steps 805 to 816 in FIG. 8A and FIG. 8B and (2), (3), (4), (10), (12), and (14) in FIG. 5A and FIG. 5B. Details are not described herein again.

Figure 12A:
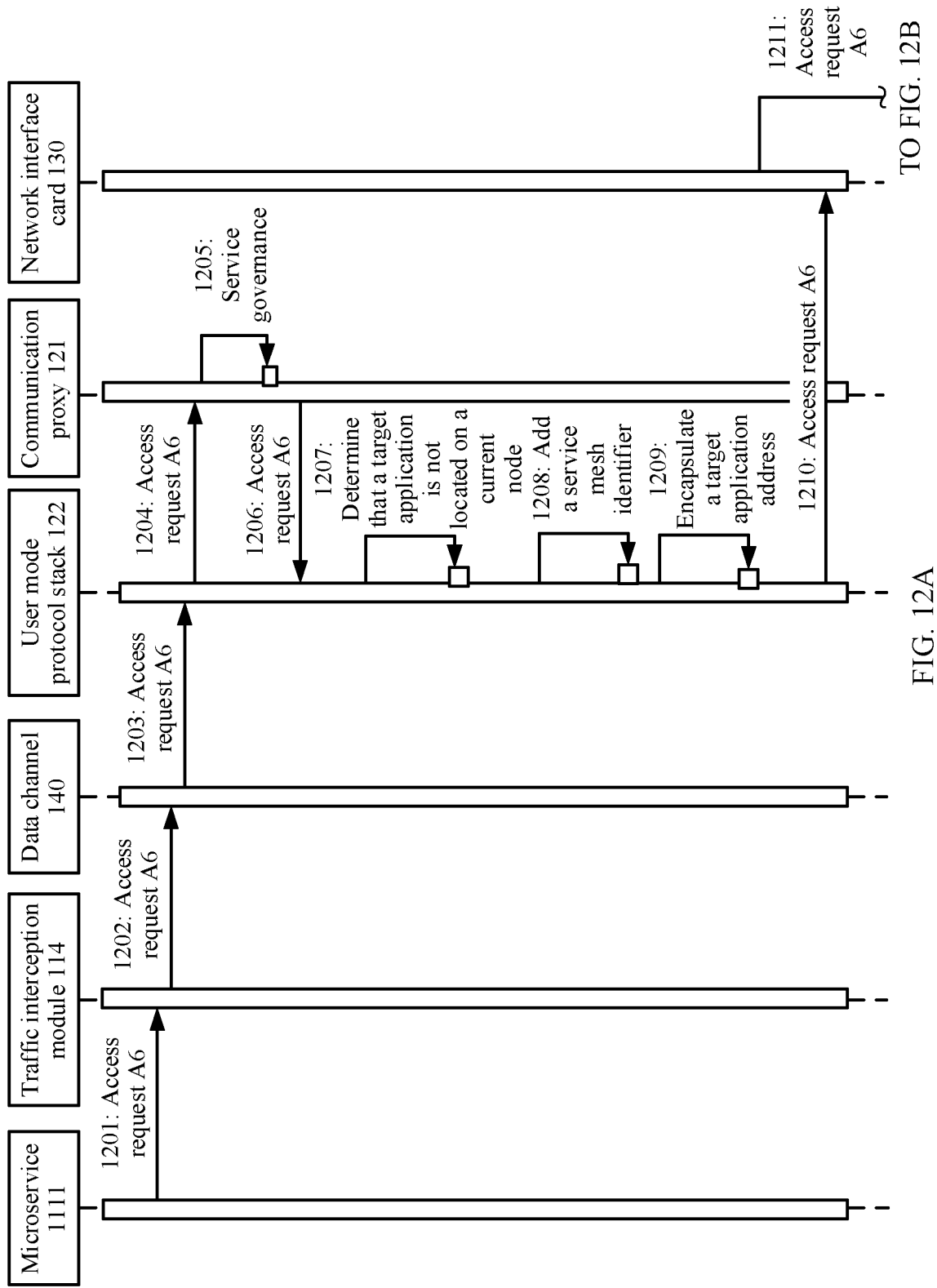
FIG. 12A and FIG. 12B are a flowchart of application call according to an embodiment of this disclosure.
Figure 12B:
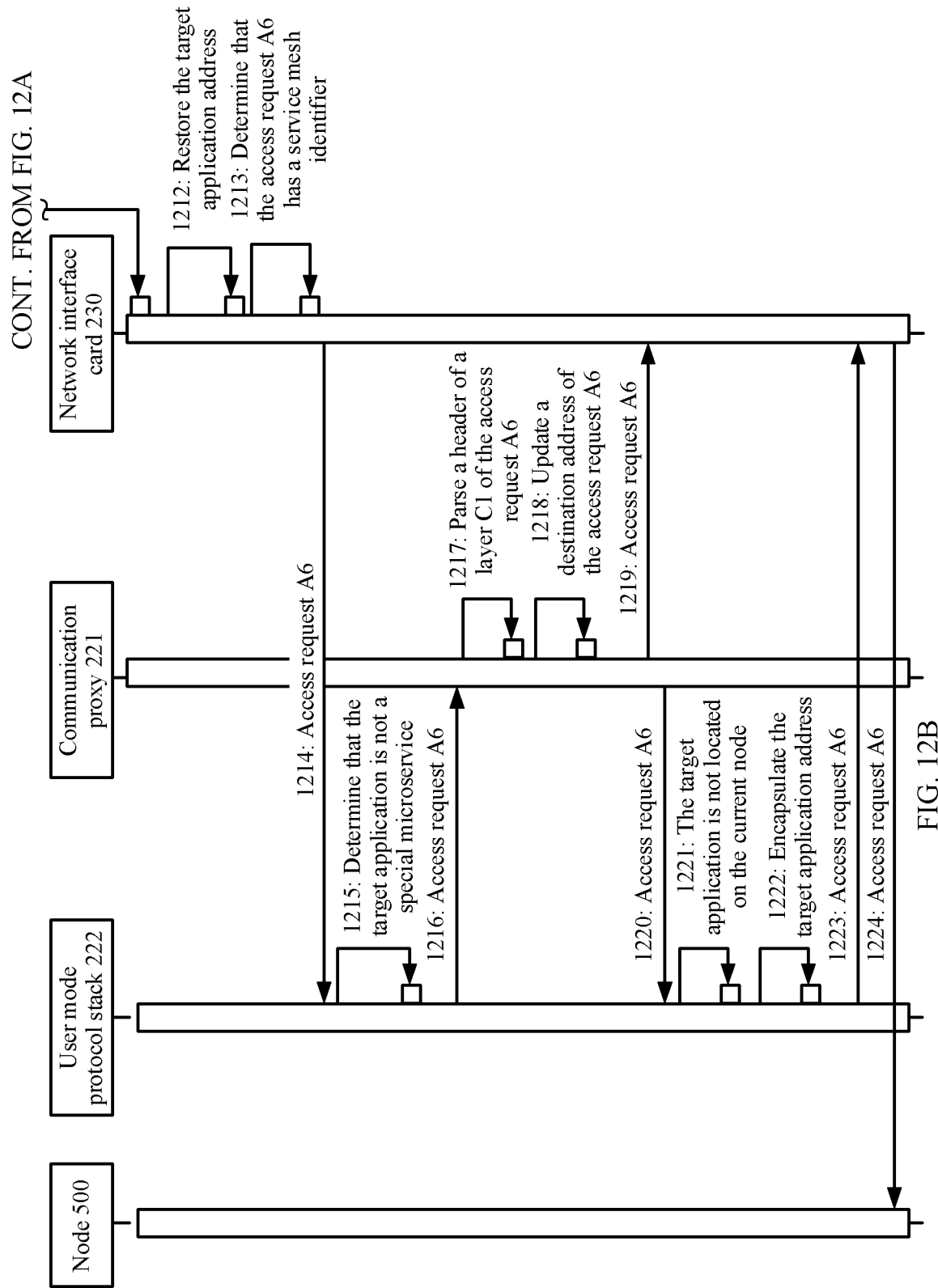
Figure 13B:
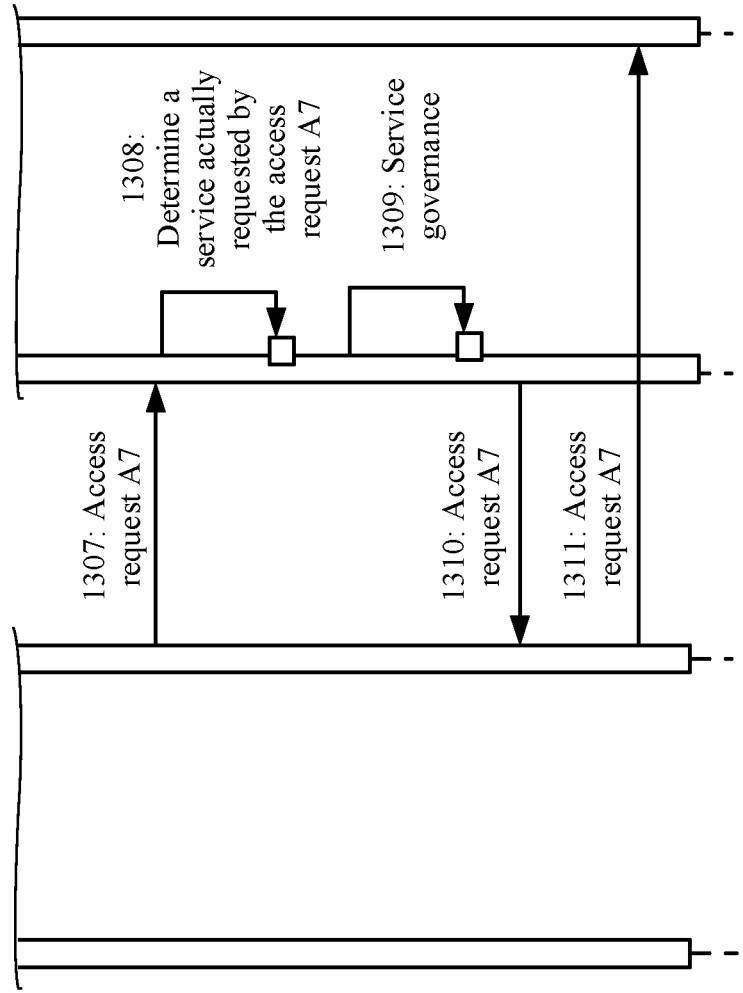
Figure 14A:
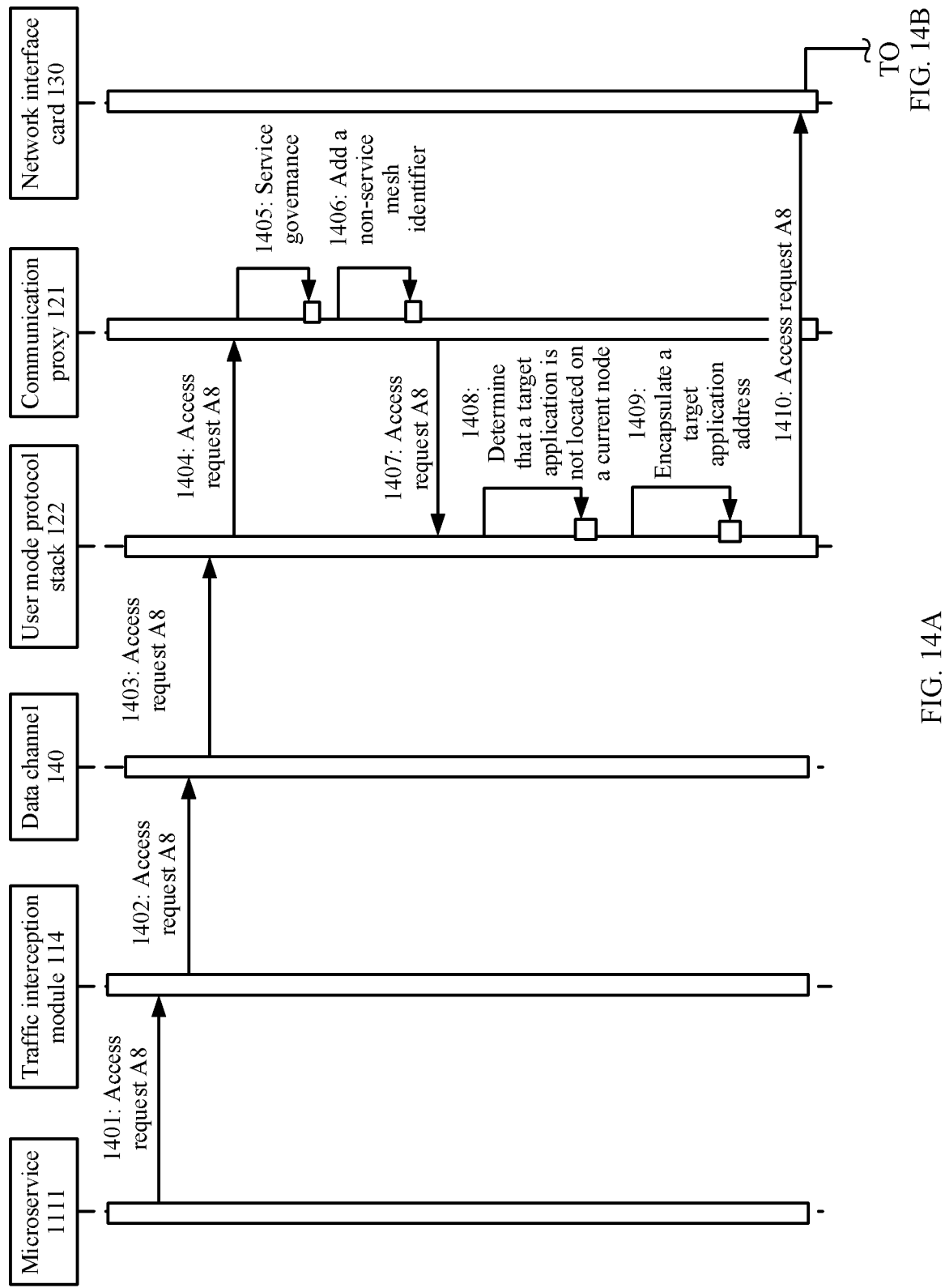
FIG. 14A and FIG. 14B are a flowchart of application call according to an embodiment of this disclosure.
Figure 14B:
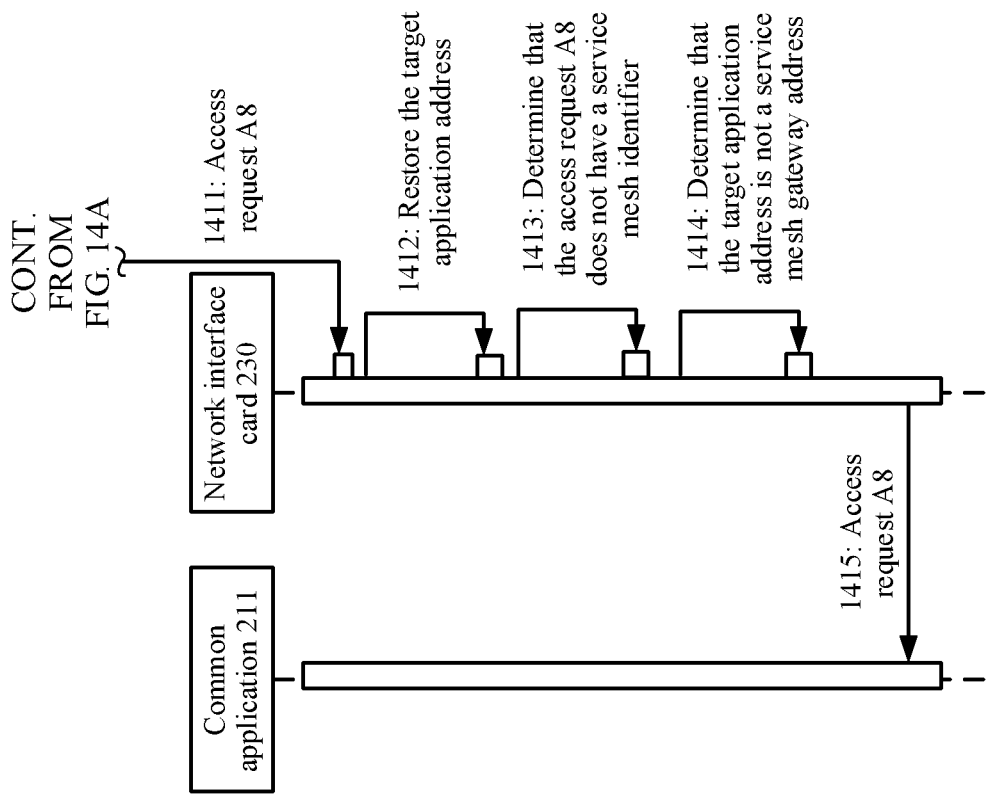

Still refer to FIG. 12B. The communication proxy 221 may perform step 1217 of parsing a header in the layer C1 of the access request A6, to obtain the network address of the application B. The communication proxy 221 may skip performing SOA governance on the access request A6, but perform step 1218 of updating the target application address of the access request A6 to the network address of the application B. In other words, the target application of the access request A6 is updated to the application B. Then, step 1220 of sending the updated access request A6 to the user mode protocol stack 222 may be performed. For example, in step 1220, the communication proxy 221 may call the API of the user mode protocol stack 222 to add an SOA governance identifier to the access request A6.

For execution of steps 1217 to 1220, refer to (15) in FIG. 5B. The communication proxy 221 may record the access request A6 as inbound traffic, and determine, based on content (that is, content of the layer C1) in a data packet of the access request A6, that the node 200 is a relay node of the access request A6. In this way, the communication proxy 221 skips subsequent SOA governance; updates the target application address of the access request A6 to the address of the application B; and because the access request A6 is inbound traffic, calls the API of the user mode protocol stack 222 to add the SOA governance identifier to the access request A6.

The user mode protocol stack 222 may perform step 1221 of determining that the target application of the access request A6 is not located on this node (the node 200), and perform step 1222 of encapsulating the target application address of the access request A6. For example, the network address of the application B may be encapsulated into an IP address of the node 500. In an example, when the application B is a microservice, the user mode protocol stack 222 may further add the service mesh identifier to the access request A6. Then, the user mode protocol stack 222 may send the access request A6 to the network interface card 230 in step 1223. The network interface card 230 may perform step 1224 of sending the access request A6 to the node 500.

For execution of steps 1221 to 1224, refer to (16) in FIG. 5B. The user mode protocol stack 222 may determine that the target application of the access request A6 is not located on this node, and determine, based on the SOA governance identifier of the access request A6, that the access request A6 is inbound traffic. In this case, the user mode protocol stack 222 may add the service mesh identifier to the access request A6, encapsulate the target application address, and then send the access request A6 to the network 300 using the network interface card 230, to send the access request A6 to the node 500 using the network 300.

According to the foregoing solution, when there is no direct communication connection between a node and another node, the other node may be used as a relay node, so as to implement indirect communication between the nodes.

Embodiment 7

The Common Application on the Node 100 Calls the Microservice on the Node 200

In a scenario in which a common application needs to call a microservice, the communication proxy can be configured as an inbound gateway. The inbound gateway may also be referred to as a service mesh gateway. When a destination address of an access request is a service mesh gateway address, even if the access request does not include a service mesh identifier, a network interface card may send the access request to a data card, such that the data card performs SOA governance on the access request, and sends the access request to a corresponding microservice. In this way, the common application calls the microservice.

Next, with reference to FIG. 13A, FIG. 13B, FIG. 5A, and FIG. 5B, an example in which the common application 113 calls the microservice 2141 is used to describe the solution in which the common application calls the microservice provided in this embodiment.

The common application 113 may generate an access request A7 that uses the service mesh gateway address of the node 200 as an initial destination address. In addition, the service request A7 may further include a service identifier of a service required by the common application 113. For the service identifier, refer to the foregoing description. Details are not described herein again. For example, the access request A7 may be a data packet, and the service identifier may be encapsulated into a header of an application layer of the data packet. In addition, it may be understood that the destination address of the access request A7 is usually located at a transport layer.

The common application 113 may perform step 1301 of sending the access request A7 to the network interface card 130. Refer to (5) in FIG. 5A. When the access request A7 passes through the traffic interception module 114, the traffic interception module 114 determines that the initial destination address of the access request A7 is not located in the governance-required list. For example, the initial destination address of the access request A7 may be an address located at the transport layer. That is, the traffic interception module 114 determines that the address of the transport layer of the access request A7 is not located in the governance-required list. Further, the traffic interception module 114 may send the access request A7 to the network interface card 130 through the virtual network port.

The network interface card 130 may perform step 1302 of encapsulating the initial destination address of the access request A7. For example, the service mesh gateway address used as the initial destination address may be a network address of a listening port of the communication proxy 221. The network address of the listening port may be encapsulated into the IP address of the node 200.

The network interface card 130 may perform step 1303 of sending the access request A7 whose initial destination address is encapsulated to the network interface card 230. For details, refer to (10) in FIG. 5B. In step 1303, the access request A7 may enter the network 300 through the physical network interface card of the network interface card 130, and may be received by the physical network interface card of the network interface card 230 after being forwarded by the network 300.

The network interface card 230 may perform step 1304 of restoring the initial destination address of the access request A7. That is, the service mesh gateway address is restored. The network interface card 230 may perform step 1305 of sending the access request A7 to the user mode protocol stack 222. Refer to (17b) and (12) in FIG. 5B. The network interface card 230 may determine that the initial destination address of the access request A7 is the service mesh gateway address. When the initial destination address of the access request A7 is the service mesh gateway address, even if the access request A7 does not have a service mesh identifier, the network interface card 230 may send the access request A7 to the user mode protocol stack 222 through the virtual network port.

The user mode protocol stack 222 may perform step 1306 of determining that the initial destination address of the access request A7 is the address of the service mesh gateway, and then may perform step 1307 of sending the access request A7 to the communication proxy 221. In an example, refer to (14) in FIG. 5B. The initial destination address may be set to the network address of the listening port 3 of the communication proxy 221. When determining that the initial destination address is not an address of the special microservice and that the access request A7 does not have the service mesh identifier, the user mode protocol stack 222 may send the access request A7 to the listening port 3 of the communication proxy 221.

The communication proxy 221 may perform step 1308 of determining a service actually requested by the access request A7. As described above, the access request A7 carries the service identifier, and the service identifier is used to indicate the service required by the common application 113. The service identifier may be in a header of an application layer of the access request A7. The communication proxy 221 may parse the access request A7, for example, may parse the header of the application layer of the access request A7, so as to obtain the service identifier. After obtaining the service identifier, the communication proxy 221 may perform step 1309 of performing SOA governance on the access request A7. A microservice used to provide the service indicated by the service identifier may be determined based on the service identifier using the service list and the SOA governance policy. In this embodiment, it may be determined that the microservice 2141 is used to provide the service indicated by the service identifier. Then, the communication proxy 221 may perform step 1310 of sending the access request A7 to the user mode protocol stack 222. For execution of step 1308 to step 1310, refer to (14) in FIG. 5B. When receiving the access request A7 through the listening port 3, the communication proxy 221 may record the access request A7 as inbound traffic. After SOA governance is performed on the access request A7, when the access request A7 is sent to an upstream module or component, the API of the user mode protocol stack 222 may be called to add an SOA governance identifier to the access request A7.

In this embodiment, a service identifier of a service may be referred to as an identifier of the service for short.

The user mode protocol stack 222 may perform step 1311 of sending the access request A7 to the microservice 2141. For a process of step 1311, refer to the foregoing descriptions of steps 819 to 821 in FIG. 8B. Details are not described herein again.

Therefore, a connection between the common application 113 and the microservice 2141 may be established, such that the common application 113 calls the microservice 2141. For example, the access request A7 may be a socket connection request, and the established connection between the common application 113 and the microservice 2141 may be a socket connection.

Embodiment 8

The Microservice on the Node 100 Calls the Common Application of the Node 200

Some common applications in the service mesh system may be called by microservices. In this embodiment, to enable these common applications to be called by microservices, service identifiers of services provided by these common applications may be predefined. A service C is used as an example. A service identifier of the service C may be information describing or indicating the service C. The service C may be provided by a common application. The service identifiers of the services provided by these common applications may be set in the governance-required list. In this embodiment, for ease of description, the service identifier of the service provided by the common application may be referred to as the service identifier of the common application. For example, the service identifier of the common application may be a network address of the common application. In an example, the network address of the common application may include an IP address and a port number of the common application.

As described above, the governance-required list may be preconfigured by a developer or operation and maintenance personnel of the service mesh system. When the governance-required list is configured, the service identifier of the common application that may be called by the microservice may be added to the governance-required list. When the governance-required list includes the service identifier of the common application, an access request that carries the service identifier of the common application may be sent to a data card, so as to accept SOA governance of the communication proxy. Therefore, the service identifier of the common application is used to declare that SOA governance needs to be performed on the access request.

In some embodiments, the service list may also include a correspondence between the service identifier and the network address of the common application, such that the communication proxy can determine an accessible network address based on the service identifier. The service list includes a type of an application corresponding to the network address, and the type of the application may be classified into a microservice and a common application. To be specific, the service list records whether the application corresponding to the network address is a microservice or a common application.

For a configuration manner of the governance-required list and the service list, refer to the foregoing descriptions of the embodiment shown in FIG. 6. Details are not described herein again.

Next, with reference to FIG. 14A, FIG. 14B, FIG. 5A, and FIG. 5B, an example in which the microservice 1111 calls the common application 211 is used to describe the solution in which the microservice calls the common application provided in this embodiment.

When the microservice 1111 needs to use a service provided by the common application 211, the microservice 1111 may generate an access request A8, and use a service identifier of the service as an initial destination address of the access request A8.

The microservice 1111 may perform step 1401 of sending the access request A8 to the traffic interception module 114.

The traffic interception module 114 may determine that the initial destination address of the access request A8 or the service identifier carried in the access request A8 is located in the governance-required list, and the traffic interception module 114 may perform step 1402 of sending the access request A8 to the data channel 140. The data channel 140 may perform step 1403 of sending the access request A8 to the user mode protocol stack 122. The user mode protocol stack 122 may perform step 1404 of sending the access request A8 to the communication proxy 121. For execution of steps 1401 to 1404, refer to the foregoing descriptions of steps 701 to 704 in FIG. 7 and (1) and (2) in FIG. 5A. Details are not described herein again.

The communication proxy 121 may perform step 1405 of performing SOA governance on the access request A8. The SOA governance may include determining, based on the service identifier carried in the access request A8, using the service list, and based on a load balancing policy, the application that can provide the service described by the service identifier. The determined application may be set to the common application 211. After step 1405, the network address of the common application 211 is determined as a target application address of the access request A8, and correspondingly, the common application 211 is determined as a target application of the access request A8.

The communication proxy 121 may perform step 1406 of adding a non-service mesh identifier to the access request A8. The non-service mesh identifier is used to indicate that a target application of an access request carrying the non-service mesh identifier is not a microservice. As described above, the service list records the type of the application corresponding to the network address. When it is determined that the network address of the common application 211 is determined as the target application address of the access request A8, it may be determined that the target application of the access request A8 is a common application rather than a microservice in the service mesh. Therefore, the non-service mesh identifier may be added to the access request A8. For example, the communication proxy 121 may call an API to add the non-service mesh identifier to the access request A8.

After performing step 1406, the communication proxy 121 may perform step 1407 of sending the access request A8 to the user mode protocol stack 122.

The user mode protocol stack 122 may perform step 1408 of determining that the target application of the access request A8 is not located on this node, and determining that the access request A8 has the non-service mesh identifier. Then, the user mode protocol stack 122 may perform step 1409 of encapsulating the target application address of the access request A8. The target application address of the access request A8 may be encapsulated into the IP address of the node 200.

Then, the user mode protocol stack 122 may send the access request A8 to the network interface card 130. When receiving the access request A8, the network interface card 130 may perform step 1411 of sending the access request A8 to the network interface card 230.

When receiving the access request A8, the network interface card 230 may perform step 1412 of restoring the target application address of the access request A8. Step 1413 and step 1414 may be further performed. In step 1413, it may be determined that the access request A8 does not have the service mesh identifier, and it may be determined that the access request A8 has the non-service mesh identifier. In step 1414, it is determined that the target application address of the access request A8 is not the service mesh gateway address. Therefore, the network interface card 230 may perform step 1415 of directly sending the access request A8 to the common application 211.

Refer to (11) in FIG. 5B. When A8 does not have the service mesh identifier, and the target application address of the access request A8 is not the service mesh gateway address, the network interface card 230 no longer sends the access request A8 to the data card 220, but directly sends the access request A8 to the host 210 through the virtual network port, such that the host 210 can directly send the access request A8 to the common application 211.

Therefore, a connection between the microservice 1111 and the common application 211 is established, such that the microservice 1111 calls the common application 211. For example, the access request A8 may be a socket connection request, and the established connection between the microservice 1111 and the common application 211 may be a socket connection.

It can be learned from the foregoing description that, in this embodiment of this disclosure, the sidecar may be deployed to the data card, such that service calling in the service mesh may sink to the data card for processing and sending. Therefore, no more computing resources of the host are occupied, SOA governance efficiency is improved, and computing resources of the host are saved. In addition, a client application can be applied to the service mesh system provided in this embodiment of this disclosure without being reconstructed. Therefore, the service mesh system has high utilization value.

With reference to the foregoing embodiment, an embodiment of this disclosure further provides a service mesh system. As shown in FIG. 4, the service system may include the node 100. The node 100 includes the host 110 and the data card 120. The data card 120 is inserted into the host 110. The data channel 140 is established between the data card 120 and the host 110. A first pod runs on the host 110. The first pod is provided with a first microservice. The data card 120 accesses the network 300.

The data card 120 may receive, using the network 300, an SOA governance policy sent by a management and control node, and perform, based on the SOA governance policy, SOA governance on a first access request sent by the host 110 to the data card 120 through the data channel 140. The first access request is an access request that is of the first microservice for a second microservice and that is obtained by the host 110 from the first pod. For details, refer to the foregoing descriptions of embodiments shown in FIG. 5A and FIG. 5B, FIG. 6, and FIG. 7. Details are not described herein again.

In some embodiments, the SOA governance policy includes a correspondence between the second microservice and a network address of a second pod running the second microservice. The data card 120 is configured to: determine, based on the SOA governance policy, the network address of the second pod running the second microservice, set a destination address of the first access request to the network address of the second pod, determine that the second pot is disposed on the host 110, and send the modified first access request to the second pod through the data channel 140. For details, refer to the foregoing descriptions of Embodiment 1. Details are not described herein again.

In some embodiments, the SOA governance policy further includes a correspondence between a third microservice and a network address of a third pod running the third microservice. The host 110 is further configured to: obtain, from the first pod, a second access request of the first microservice for the third microservice, and send the second access request to the data card 120 through the data channel 140. The data card 120 is configured to: determine, based on the SOA governance policy, the network address of the third pod running the third microservice, set a destination address of the second access request to the network address of the third pod, determine that the third pod is not disposed on the host 110, and send the second access request using the network. For details, refer to the foregoing descriptions of Embodiment 2. Details are not described herein again.

In an example of these embodiments, the node 100 further includes the network interface card 130. The network interface card 130 is connected to the data card 120. The data card 120 accesses a network using the network interface card 130. The data card 120 is configured to send the second access request to the network interface card 130. The network interface card 130 is configured to send the second access request using the network. For details, refer to the foregoing descriptions of Embodiment 2. Details are not described herein again.

In an example of this example, refer to FIG. 4. The service mesh system further includes the node 200. The node 200 includes the host 210, the data card 220, and the network interface card 230. The data card 220 is inserted into the host 210. The data channel 240 is established between the data card 220 and the host 210. The third pod runs on the host 210. The network interface card 230 is connected to the data card 220. The network interface card 230 accesses the network. The data card 120 is further configured to: when determining that the third pod is not disposed on the host 110, set a service mesh identifier for the second access request. The network interface card 230 is configured to: receive the second access request sent by the network interface card 130, and when determining that the second access request carries the service mesh identifier, send the second access request to the data card 220. The data card 220 is configured to: when determining that the third pod is disposed on the host 210, send the second access request to the third pod through the data channel 240. For details, refer to the foregoing descriptions of Embodiment 2. Details are not described herein again.

In some embodiments, the service mesh system further includes the node 200. The node 200 includes the host 210. The host 210 and the host 110 access the network. A first application runs on the host 110. A second application runs on the host 210. The host 110 is configured to: obtain a third access request of the first application for a network address of the second application, and when determining that the second application does not run on the host 110, send the third access request using the network. The host 210 is configured to: receive the third access request sent by the host 110, and send the third access request to the second application. For details, refer to the foregoing descriptions of Embodiment 3. Details are not described herein again.

In some embodiments, the first application and the second application run on the host 110. The host 110 is configured to: obtain the third access request that is of the first application for the network address of the second application, and when determining that the second application runs on the host 110, send the third access request to the second application. For details, refer to the foregoing descriptions of Embodiment 5. Details are not described herein again.

In some embodiments, the service mesh system further includes the node 200. The node 200 includes the host 210 and the data card 220. The data card 220 is inserted into the host 210. The data channel 240 is established between the data card 220 and the host 210. A fourth pod runs on the host 210. The fourth pod is provided with a fourth microservice.

The data card 220 and the host 110 access the network. The first application runs on the host 110. The host 110 is configured to: obtain a fourth access request of the first application for a network address of the data card 220, and send the fourth access request using the network. The data card 220 is configured to: receive the fourth access request sent by the host 110, and send the fourth access request to the fourth microservice through the data channel 240 based on an identifier that is of the fourth microservice and that is carried in the fourth access request. For details, refer to the foregoing descriptions of Embodiment 7. Details are not described herein again.

In some embodiments, the service mesh system further includes the node 200. The node 200 includes the host 210. A third application runs on the host 210. The host 210 accesses the network. The host 110 is configured to: obtain a fifth access request of the first microservice for a network address of the third application, and send the fifth access request to the data card 120 through the data channel 140. The data card 120 is configured to send the fifth access request using the network. The host 210 is configured to: receive the fifth access request, and send the fifth access request to the third application. For details, refer to the foregoing descriptions of Embodiment 8. Details are not described herein again.

Figure 15:
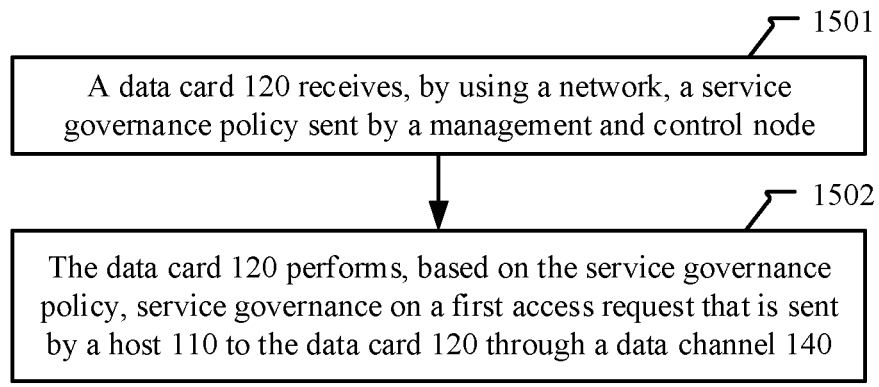
FIG. 15 is a flowchart of an SOA governance method according to an embodiment of this disclosure.

Refer to FIG. 15. An embodiment of this disclosure provides a data processing method. The method may be applied to the service mesh system shown in FIG. 4. As shown in FIG. 15, the method includes the following steps.

Step 1501: The data card 120 receives, using a network, an SOA governance policy sent by a management and control node.

Step 1502: The data card 120 performs, based on the SOA governance policy, SOA governance on a first access request that is sent by the host 110 to the data card 120 through the data channel 140. The first access request is an access request that is of a first microservice for a second microservice and that is obtained by the host 110 from a first pod.

For details, refer to the foregoing descriptions of embodiments shown in FIG. 5A and FIG. 5B, FIG. 6, and FIG. 7. Details are not described herein again.

In some embodiments, the SOA governance policy includes a correspondence between the second microservice and a network address of a second pod running the second microservice. Step 1502 includes: The data card 120 determines, based on the SOA governance policy, the network address of the second pod running the second microservice, and sets a destination address of the first access request to the network address of the second pod. The data card 120 determines that the second pot is disposed on the host 110, and sends the modified first access request to the second pod through the data channel 140. For details, refer to the foregoing descriptions of Embodiment 1. Details are not described herein again.

In some embodiments, the SOA governance policy further includes a correspondence between a third microservice and a network address of a third pod running the third microservice. The method further includes: the host 110 obtains, from the first pod, a second access request of the first microservice for the third microservice, and sends the second access request to the data card 120 through the data channel 140. The data card 120 determines, based on the SOA governance policy, the network address of the third pod running the third microservice, and sets a destination address of the second access request to the network address of the third pod. The data card 120 determines that the third pod is not disposed on the host 110, and sends the second access request using the network. For details, refer to the foregoing descriptions of Embodiment 2. Details are not described herein again.

In an example of these embodiments, the node 100 further includes the network interface card 130. The network interface card 130 is connected to the data card 120. The data card 120 accesses the network using the network interface card 130. That the data card 120 determines that the third pod is not disposed on the host 110, and sends a second access request using the network includes: the data card 120 determines that the third pod is not disposed on the host 110, and sends the second access request to the network interface card 130. The network interface card 130 sends the second access request using the network. For details, refer to the foregoing descriptions of Embodiment 2. Details are not described herein again.

In an example of this example, the service mesh system further includes the node 200. The node 200 includes the host 210, the data card 220, and the network interface card 230. The data card 220 is inserted into the host 210. The data channel 240 is established between the data card 220 and the host 210. The third pod runs on the host 210. The network interface card 230 is connected to the data card 220. The network interface card 230 accesses the network. The method further includes: when determining that the third pod is not disposed on the host 110, the data card 120 sets a service mesh identifier for the second access request. The network interface card 230 receives the second access request sent by the network interface card 130, and when determining that the second access request carries the service mesh identifier, sends the second access request to the data card 220. When determining that the third pod is disposed on the host 210, the data card 220 sends the second access request to the third pod through the data channel 240. For details, refer to the foregoing descriptions of Embodiment 2. Details are not described herein again.

In some embodiments, the service mesh system further includes the node 200. The node 200 includes the host 210. The host 210 and the host 110 access the network. A first application runs on the host 110. A second application runs on the host 210. The method further includes:

The host 110 obtains a third access request of the first application for a network address of the second application, and when determining that the second application does not run on the host 110, sends the third access request using the network. The host 210 receives the third access request sent by the host 110, and sends the third access request to the second application. For details, refer to the foregoing descriptions of Embodiment 3. Details are not described herein again.

In some embodiments, the first application and the second application run on the host 110. The method further includes: the host 110 obtains the third access request that is of the first application for the network address of the second application, and when determining that the second application runs on the host 110, sends the third access request to the second application. For details, refer to the foregoing descriptions of Embodiment 5. Details are not described herein again.

In some embodiments, the service mesh system further includes the node 200. The node 200 includes the host 210 and the data card 220. The data card 220 is inserted into the host 210. The data channel 240 is established between the data card 220 and the host 210. A fourth pod runs on the host 210. The fourth pod is provided with a fourth microservice. The data card 220 and the host 110 access the network. The first application runs on the host 110. The method further includes: the host 110 obtains a fourth access request of the first application for a network address of the data card 220, and sends the fourth access request using the network. The data card 220 receives the fourth access request sent by the host 110, and sends the fourth access request to the fourth microservice through the data channel 240 based on an identifier that is of the fourth microservice and that is carried in the fourth access request. For details, refer to the foregoing descriptions of Embodiment 7. Details are not described herein again.

In some embodiments, the service mesh system further includes the node 200. The node 200 includes the host 210. A third application runs on the host 210. The host 210 accesses the network. The method further includes: the host 110 obtains a fifth access request of the first microservice for a network address of the third application, and sends the fifth access request to the data card 120 through the data channel 140. The data card 120 sends the fifth access request using the network. The host 210 receives the fifth access request, and sends the fifth access request to the third application. For details, refer to the foregoing descriptions of Embodiment 8. Details are not described herein again.

Figure 16:
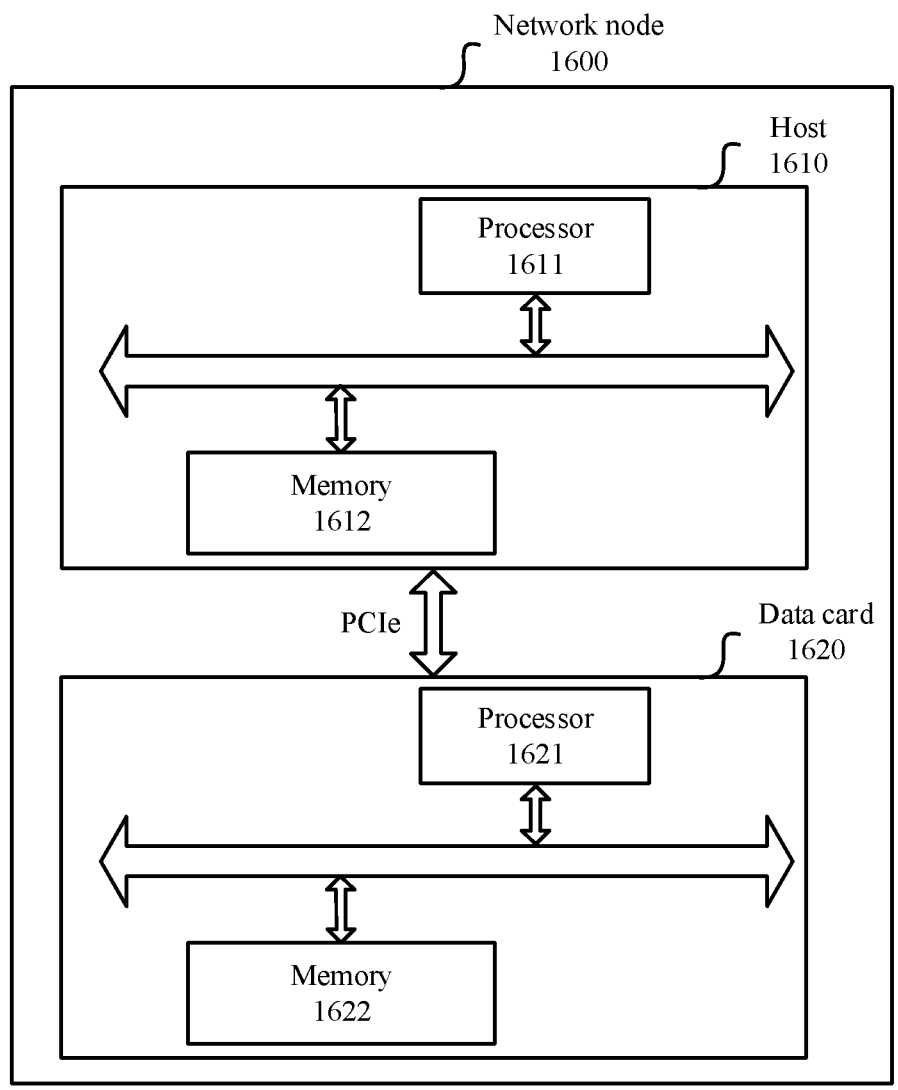
FIG. 16 is a schematic block diagram of a network node according to an embodiment of this disclosure.

Refer to FIG. 16. An embodiment of this disclosure further provides a network node 1600, including a host 1610 and a data card 1620. The data card 1620 is inserted into the host 1610. For example, as shown in FIG. 16, the data card 1620 is inserted into the host 1610 using a PCIe interface.

The host 1610 may include a processor 1611 and a memory 1612. The memory 1612 stores computer instructions, and the computer instructions may be executed by the processor 1611. The data card 1620 may include a processor 1621 and a memory 1622. The memory 1622 stores computer instructions, and the computer instructions may be executed by the processor 1621. When the computer instructions stored in the memory 1612 are executed by the processor 1611, and the computer instructions stored in the memory 1622 are executed by the processor 1621, the network node 1600 may perform operations performed by the node 100 or the node 200 in embodiments shown in FIG. 5A and FIG. 5B to FIG. 15.

It may be understood that, the processor in embodiments of this disclosure may be a CPU, the processor may further be another general-purpose processor, a digital signal processor (DSP), an application-specific integrated circuit (ASIC), a field-programmable gate array (FPGA) or another programmable logic device, a transistor logic device, a hardware component, or any combination thereof. The general-purpose processor may be a microprocessor or any processor. It may be understood that various numbers in embodiments of this disclosure are merely used for differentiation for ease of description, and are not used to limit the scope of embodiments of this disclosure.

What is claimed is:
1. A microservice-based service mesh system, comprising:
a first node comprising:
a first host configured to:
run a first pod, wherein the first pod is provided with a first microservice; and
obtain, from the first pod, a first access request of the first microservice for a second microservice on a second pod:
a first data card inserted into the first host and configured to:
establish a first data channel between the first data card and the first host wherein the first data card is a hardware device having an independent computing resource separate from the first host;
access a network form a network interface card;
receive, from a management and control node through the network interface card, a service-oriented architecture governance policy;
receive, from the first host through the first data channel, the first access request; and
perform, based on the service-oriented architecture governance policy, service-oriented architecture governance on the first access request sent from the first host to the first data card through the first data channel for the second microservice to improve service-oriented architecture governance efficiency.

2. The microservice-based service mesh system of claim 1, wherein the service-oriented architecture governance policy comprises a correspondence between the second microservice and a network address of h second pod running the second microservice, and wherein the first data card is further configured to:
determine, based on the service-oriented architecture governance policy, the network address;
set a destination address of the first access request to the network address;
determine that the second pod is disposed on the first host; and
send, through the first data channel, a modified first access request to the second pod.

3. The microservice-based service mesh system of claim 1, wherein the service-oriented architecture governance policy comprises a correspondence between a third microservice and a network address of the second pod running the third microservice, wherein the first host is further configured to:
obtain, from the first pod, a second access request of the first microservice for the third microservice; and
send, to the first data card through the first data channel, the second access request, and
wherein the first data card is further configured to:
determine, based on the service-oriented architecture governance policy, the network address;
set a destination address of the second access request to the network address;
determine that the second pod is not disposed on the first host; and
send, using the network, the second access request.

4. The microservice-based service mesh system of claim 3, wherein the first node further comprises a first network interface card, wherein the first network interface card is connected to the first data card, wherein the first data card is configured to:
access, using the first network interface card, the network, and
send, to the first network interface card, the second access request, and
wherein the first network interface card is configured to send, using the network, the second access request.

5. The microservice-based service mesh system of claim 4, further comprising:
a second node comprising:
a second host configured to run the second pod;
a second data card; and
a second network interface card inserted into the second host, connected to the second data card, and configured to:
establish a second data channel between the second data card and the second host; and
access the network,
wherein the first data card is further configured to set a service mesh identifier for the second access request when determining that the second pod is not disposed on the first host,
wherein the second network interface card is further configured to:
receive, from the first network interface card, the second access request; and
send the second access request to the second data card when determining that the second access request carries the service mesh identifier, and
wherein the second data card is further configured to send, to the second pod through the second data channel, the second access request.

6. The microservice-based service mesh system of claim 1, further comprising a second node, wherein the second node comprises a second host, wherein the first host is configured to:
access the network;
run a first application;
obtain a second access request of the first application for a network address of a second application; and
send, using the network, the second access request when determining that the second application does not run on the first host, and
wherein the second host is configured to:
access the network;
run the second application;
receive, from the first host, the second access request; and
send, to the second application, the second access request.

7. The microservice-based service mesh system of claim 1,
wherein the first host is further configured to:
run a first application and a second application;
obtain a second access request of the first application for a network address of the second application; and
send, to the second application, the second access request when determining that the second application runs on the first host.

8. The microservice-based service mesh system of claim 1, further comprising:
a second node comprising:
a second host configured to run the second pod, wherein the second pod is provided with a third microservice; and
a second data card inserted into the second host and configured to:
access the network; and
establish a second data channel between the second data card and the second host,
wherein the first host is further configured to:
access the network;
run a first application;
obtain a second access request of the first application for a network address of the second data card; and
send, using the network, the second access request, and
wherein the second data card is further configured to:
receive the second access request comprising an identifier of the third microservice; and
send, to the third microservice through the second data channel based on the identifier, the second access request.

9. The microservice-based service mesh system of claim 1, further comprising a second node comprising a second host, wherein the first host is further configured to:
   obtain a second access request of the first microservice fora network address of an application; and
   send, to the first data card through the first data channel, the second access request,
   wherein the first data card is configured to send, using the network, the second access request, and
   wherein the second host is further configured to:
      access the network;
      run the application;
      receive the second access request; and
      send, to the application, the second access request.

10. A method implemented by a microservice-based service mesh system, wherein the method comprises:
   running, by a first host of the microservice-based service mesh system, a first pod, wherein the first pod is provided with a first microservice;
   obtaining, by the first host from the first pod, a first access request of the first microservice for a second microservice on a second pod;
   establishing, by a first data card of the microservice-based service mesh system, a first data channel between the first data card and the first host, wherein the first data card is a hardware device having an independent computer resource separate from the first host;
   accessing, by the first data card, a network through a network interface card;
   receiving, by the first data card from a management and control node through the network interface card, a service-oriented architecture governance policy;
   receiving, by the first data card through the first data channel, the first access request; and
   performing, by the first data card based on the service-oriented architecture governance policy, service-oriented architecture governance on the first access request sent from the first host to the first data card through the first data channel for the second microservice to improve service-oriented architecture governance efficiency.

11. The method of claim 10, wherein the service-oriented architecture governance policy comprises a correspondence between the second microservice and a network address of the second pod running the second microservice, and wherein performing the service-oriented architecture governance policy comprises:
   determining, by the first data card based on the service-oriented architecture governance policy, the network address;
   setting, by the first data card, a destination address of the first access request to the network address;
   determining, by the first data card, that the second pod is disposed on the first host; and
   sending, through the first data channel, a modified first access request to the second pod.

12. The method of claim 10, wherein the service-oriented architecture governance policy comprises a correspondence between a third microservice and a network address of the second pod running the third microservice, and wherein the method further comprises:
   obtaining, by the first host from the first pod, a second access request of the first microservice for the third microservice;
   sending, by the first host to the first data card through the first data channel, the second access request;
   determining, by the first data card based on the service-oriented architecture governance policy, the network address;
   setting, by the first data card, a destination address of the second access request to the network address;
   determining, by the first data card, that the second pod is not disposed on the first host; and
   sending, by the first data card using the network, the second access request.

13. The method of claim 12, wherein sending the second access request comprises:
   sending, by the first data card to a first network interface card connected to the first data card, the second access request, wherein the first data card accesses the network using the first network interface card; and
   sending, by the first network interface card using the network, the second access request.

14. The method of claim 13, further comprising:
   setting, by the first data card, a service mesh identifier for the second access request when determining that the second pod is not disposed on the first host;
   receiving, by a second network interface card of a second node of the microservice-based service mesh system, the second access request;
   sending, by the second network interface card to a second data card of the second node, the second access request when determining that the second access request carries the service mesh identifier; and
   sending, by the second data card to the second pod disposed on a second host of the second node, the second access request when determining that the second pod is disposed on the second host.

15. The method of claim 10, further comprising:
   obtaining, by the first host, a second access request of a first application running on the first host for a network address of a second application running on a second host of a second node of the microservice-based service mesh system;
   sending, by the first host using the network accessed by the first host and the second host, the second access request when determining that the second application does not run on the first host;
   receiving, by the second host, the second access request; and
   sending, by the second host to the second application, the second access request.

16. The method of claim 10, further comprising:
   obtaining, by the first host, a second access request of a first application running on the first host for a network address of a second application running on the first host; and
   sending, by the first host to the second application, the second access request when determining that the second application runs on the first host.

17. The method of claim 10, further comprising:
   obtaining, by the first host, a second access request of an application for a network address of a second data card of a second node of the microservice-based service mesh system;
   sending, by the first host using the network accessed by the first host and the second data card, the second access request;
   receiving, by the second data card from the first host, the second access request comprising an identifier of a third microservice, wherein a second host runs the second pod, and wherein the second pod is provided with the third microservice; and sending, by the second data card to the third microservice through a second data channel between the second data card and the second host based on the identifier, the second access request.

18. The method of claim 10, further comprising:

obtaining, by the first host, a second access request of the first microservice for a network address of an application running on a second host of a second node of the microservice-based service mesh system;

sending, to the first data card through the first data channel, the second access request;

sending, by the first data card using the network, the second access request;

receiving, by the second host, the second access request; and sending, by the second host to the application, the second access request.

19. A computer program product comprising instructions stored on a non-transitory computer-readable storage medium that, when executed by one or more processors, cause a microservice-based service mesh system to:

run, by a first host of the microservice-based service mesh system, a first pod, wherein the first pod is provided with a first microservice;

obtain, by the first host from the first pod, a first access request of the first microservice for a second microservice on a second pod;

establish, by a first data card of the microservice-based service mesh system, a first data channel between the first data card and the first host, wherein the first data card is a hardware device using an independent computing resource separate from the first host;

access, by the first data card, a network through a network interface card;

receive, by the first data card from a management and control node through the network interface card, a service-oriented architecture governance policy;

receive, by the first data card through the first data channel, the first access request; and perform, by the first data card based on the service-oriented architecture governance policy, service-oriented architecture governance on the first access request sent from the first host to the first data card through the first data channel for the second microservice to improve service-oriented architecture governance efficiency.

20. The computer program product of claim 19, wherein the service-oriented architecture governance policy comprises a correspondence between the second microservice and a network address of the second pod running the second microservice, and wherein the one or more processors are further configured to execute the instructions to:

determine, by the first data card based on the service-oriented architecture governance policy, the network address;

set, by the first data card, a destination address of the first access request to the network address;

determine, by the first data card, that the second pod is disposed on the first host; and send, through the first data channel, a modified first access request to the second pod.

* * * * *

UNITED STATES PATENT AND TRADEMARK OFFICE
CERTIFICATE OF CORRECTION

PATENT NO. : 12,335,314 B2  
APPLICATION NO. : 18/192082  
DATED : June 17, 2025  
INVENTOR(S) : Wei Zhang, Yongming Zhang and Chaomeng Zhang Page 1 of 1

It is certified that error appears in the above-identified patent and that said Letters Patent is hereby corrected as shown below:

In the Claims

Claim 2, Column 37, Line 20: "of h second pod" should read "of the second pod"

Claim 9, Column 39, Line 5: "fora network" should read "for a network"

Claim 18, Column 41, Line 7: "fora network" should read "for a network"

Signed and Sealed this  
Twenty-ninth Day of July, 2025

Coke Morgan Stewart  
*Acting Director of the United States Patent and Trademark Office*